United States Patent
Frenz et al.

(10) Patent No.: US 10,671,503 B2
(45) Date of Patent: Jun. 2, 2020

(54) MOBILE APPLICATION INTERACTIVE USER INTERFACE FOR A REMOTE COMPUTING DEVICE MONITORING A TEST DEVICE

(71) Applicant: MTS Systems Corporation, Eden Prairie, MN (US)

(72) Inventors: Andrew Frenz, Minneapolis, MN (US); Freeman Stephen Kirschbaum, Elk River, MN (US); Philip Moorjani, Edina, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 16/378,276

(22) Filed: Apr. 8, 2019

(65) Prior Publication Data

US 2019/0332514 A1     Oct. 31, 2019

Related U.S. Application Data

(63) Continuation of application No. 14/502,031, filed on Sep. 30, 2014, now Pat. No. 10,255,156.
(Continued)

(51) Int. Cl.
*G06F 11/32* (2006.01)
*G06F 11/22* (2006.01)
(Continued)

(52) U.S. Cl.
CPC ........ *G06F 11/323* (2013.01); *G06F 11/2294* (2013.01); *H04N 7/183* (2013.01); *G06F 11/3664* (2013.01)

(58) Field of Classification Search
CPC .......................... G06F 11/323; G06F 11/2294
See application file for complete search history.

(56) References Cited

U.S. PATENT DOCUMENTS

| 5,636,008 A | 6/1997 | LoBiondo |
| 6,163,805 A | 12/2000 | Silva |

(Continued)

FOREIGN PATENT DOCUMENTS

| CN | 101388805 A | 3/2009 |
| EP | 0410932 A2 | 1/1991 |

(Continued)

OTHER PUBLICATIONS

Bo, Jiang, "MobileTest: A Tool Supporting Automatic Black Box Test for Software on Smart Mobile Devices," Second International Workshop on Automation of Software Test (AST '07), Minneapolis, MN, May 2007, pp. 1-7 (Year: 2007).

(Continued)

*Primary Examiner* — Terrell M Robinson
(74) *Attorney, Agent, or Firm* — Steven M. Koehler; Westman, Champlin & Koehler, P.A.

(57) ABSTRACT

Remotely monitoring a test on a test specimen includes receiving information pertaining to the test, rendering on a remote computing device display an information message having portions indicative of a testing device, of information related to the testing device or a test being conducted on the testing device, and of time that has elapsed since the second portion has occurred, and updating the third portion indicative of the time that has elapsed. A test operation monitoring system includes an image capture device, and a computing device operatively connected to the image capture device to receive information on the testing operation from the image capture device, the computing device having a controller configured to receive information pertaining to the testing operation and to render on a display an information message indicative of parameters of the testing device at a selectable amount of progress through the testing operation.

11 Claims, 32 Drawing Sheets

Related U.S. Application Data

(60) Provisional application No. 61/884,928, filed on Sep. 30, 2013.

(51) Int. Cl.
*H04N 7/18* (2006.01)
*G06F 11/36* (2006.01)

(56) References Cited

U.S. PATENT DOCUMENTS

| | | | |
|---|---|---|---|
| 6,351,223 B1 | 2/2002 | DeWeerd | |
| 6,425,096 B1* | 7/2002 | Liese | G06F 11/2294 714/32 |
| 6,959,235 B1* | 10/2005 | Abdel-Malek | B61L 27/0094 701/29.4 |
| RE38,985 E | 2/2006 | Boatman | |
| 8,204,498 B1* | 6/2012 | Smith | G06F 11/2294 455/423 |
| 8,583,777 B1* | 11/2013 | Boyle | H04W 24/08 709/217 |
| 8,788,885 B1 | 7/2014 | Cook | |
| 8,839,035 B1 | 9/2014 | Dimitrovich | |
| 9,015,612 B2 | 4/2015 | Nguyen | |
| 2003/0014505 A1 | 1/2003 | Ramberg | |
| 2004/0073654 A1 | 4/2004 | Sarma | |
| 2004/0078721 A1* | 4/2004 | Williams | G06F 11/0727 714/46 |
| 2005/0034029 A1 | 2/2005 | Ramberg | |
| 2006/0132161 A1 | 6/2006 | Khandros | |
| 2008/0044056 A1 | 2/2008 | Alasia | |
| 2008/0077260 A1 | 3/2008 | Porter | |
| 2008/0209415 A1* | 8/2008 | Van Riel | G06F 9/45533 718/1 |
| 2009/0259321 A1 | 10/2009 | Stellari | |
| 2009/0265137 A1* | 10/2009 | Iida | G06F 11/0748 702/183 |
| 2009/0295918 A1 | 12/2009 | Horovitz | |
| 2010/0077260 A1 | 3/2010 | Pillai | |
| 2010/0083048 A1 | 4/2010 | Calinoiu | |
| 2010/0131927 A1 | 5/2010 | Pinjala | |
| 2010/0275061 A1 | 10/2010 | Lee | |
| 2011/0035063 A1 | 2/2011 | Palayur | |
| 2011/0138310 A1 | 6/2011 | Gomez | |
| 2011/0270626 A1 | 11/2011 | Romans | |
| 2012/0029947 A1 | 2/2012 | Woolridge | |
| 2012/0053778 A1 | 3/2012 | Colvin | |
| 2012/0198279 A1 | 8/2012 | Schroeder | |
| 2012/0259575 A1 | 10/2012 | Graas | |
| 2012/0307666 A1* | 12/2012 | Giguere | H04L 43/50 370/252 |
| 2013/0196600 A1 | 8/2013 | Capers | |
| 2013/0212149 A1 | 8/2013 | Frenz | |
| 2013/0212512 A1 | 8/2013 | Frenz | |
| 2013/0219218 A1 | 8/2013 | Frenz | |
| 2015/0227445 A1* | 8/2015 | Arscott | G06F 11/3062 713/340 |

FOREIGN PATENT DOCUMENTS

| | | |
|---|---|---|
| JP | H09-120379 A | 5/1997 |
| JP | H10-240341 A | 9/1998 |
| JP | 2004-070587 A | 3/2004 |
| JP | 2004-192297 A | 7/2004 |
| JP | 2009-273245 A | 11/2009 |
| JP | 2010-0182050 A | 8/2010 |
| WO | 0045265 A1 | 8/2000 |
| WO | 2004029808 A2 | 4/2004 |
| WO | 2012024212 A1 | 2/2012 |

OTHER PUBLICATIONS

Brochure featuring MTS ECHO frequently asked questions.
Chinese Office Action, dated Sep. 12, 2018 for Chinese patent application No. 201480054010.1, filed Mar. 30, 2016, with English translation.
Japanese Office Action, dated Sep. 18, 2018 for Japanese patent application No. 2016-518125, with English translation.
Chinese Office Action for Chinese patent application No. 201480054010. 1, dated Nov. 17, 2017, with English translation.
International Search Report and Written Opinion for corresponding International application No. PCT/US2014/058321, filed Sep. 30, 2014, dated Feb. 26, 2015.
Readme File TestWatch application Release 1.3g, Copyright 1994-2004, MTS Systems Corporation.
Chinese Office Action for Chinese patent application No. 201480054010. 1, dated Apr. 30, 2019, with English translation.
Notice of Reasons for Rejection from the Japanese patent application No. 2016-518125, dated Jul. 29, 2019, with English translation.
Communication from the European Patent Office for European Patent Application No. 14796928.1 dated Feb. 20, 2020.

* cited by examiner

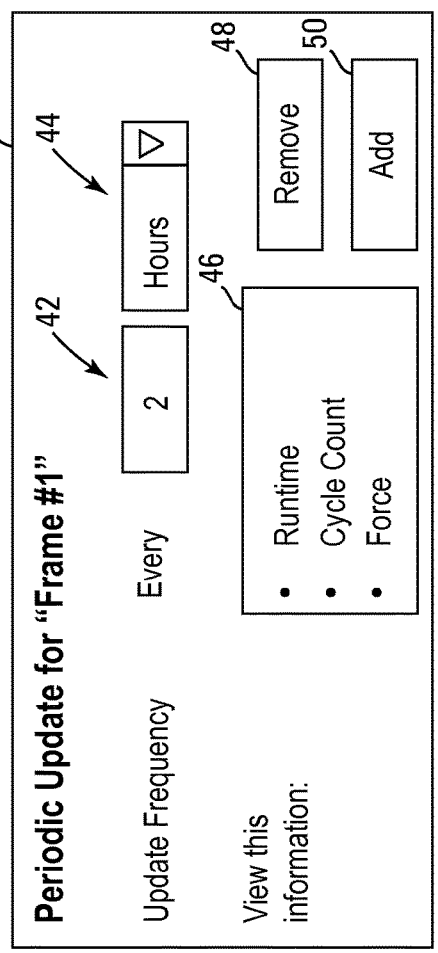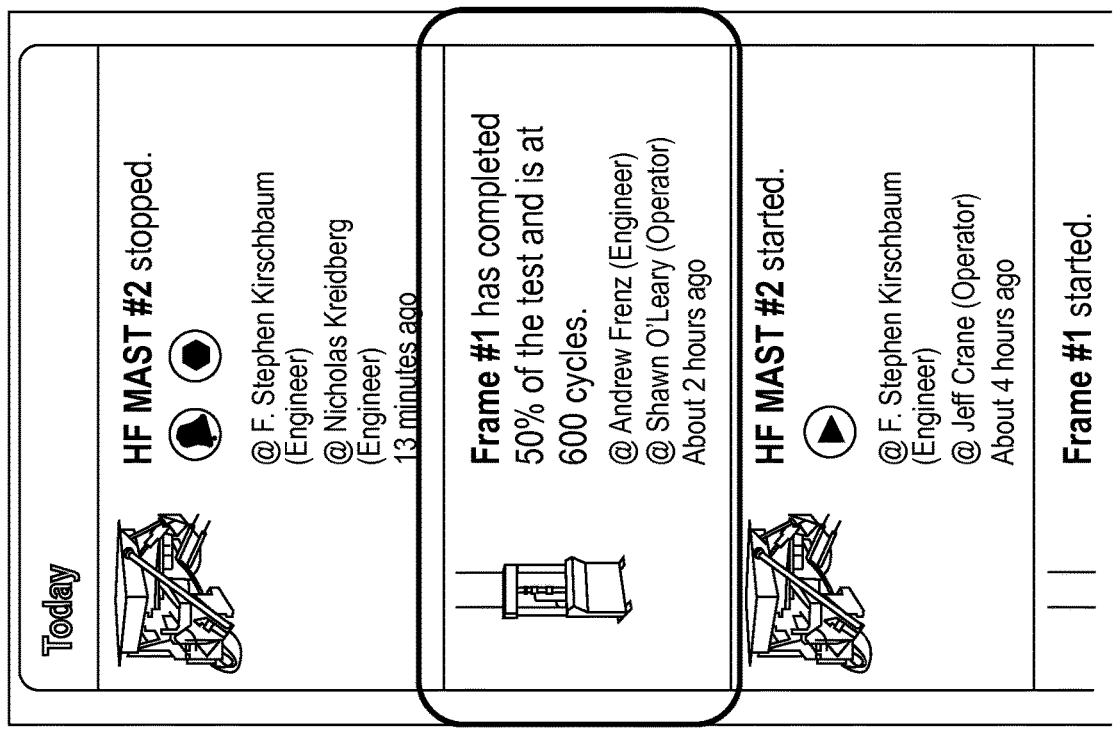
Fig. 2

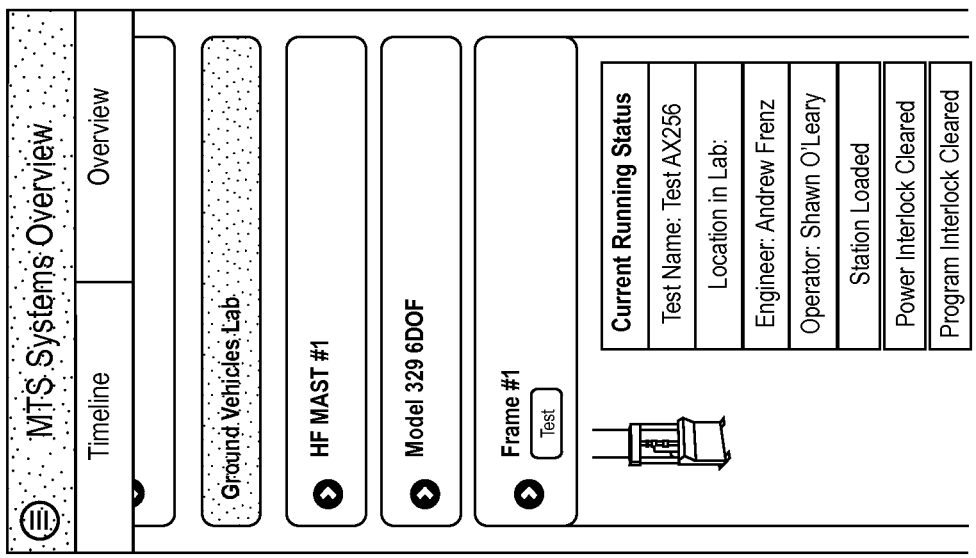
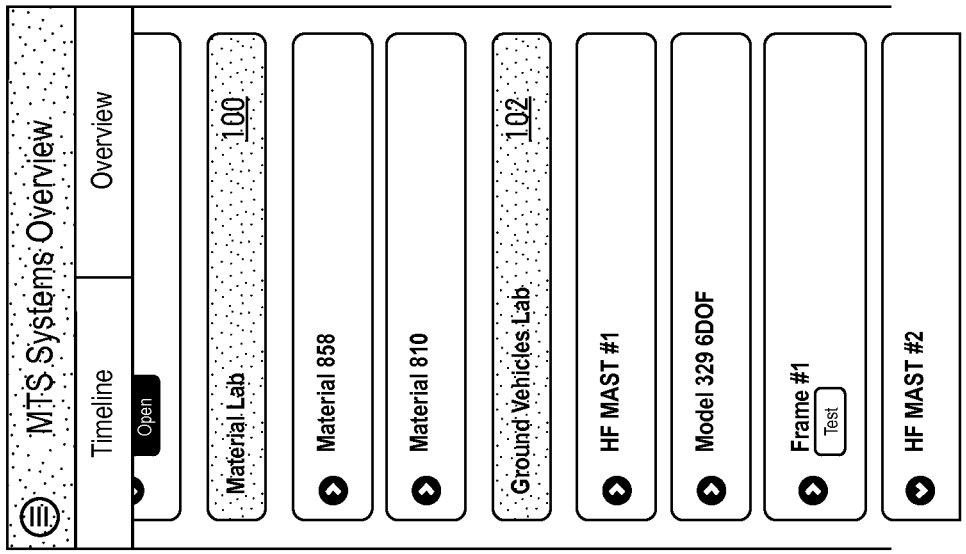
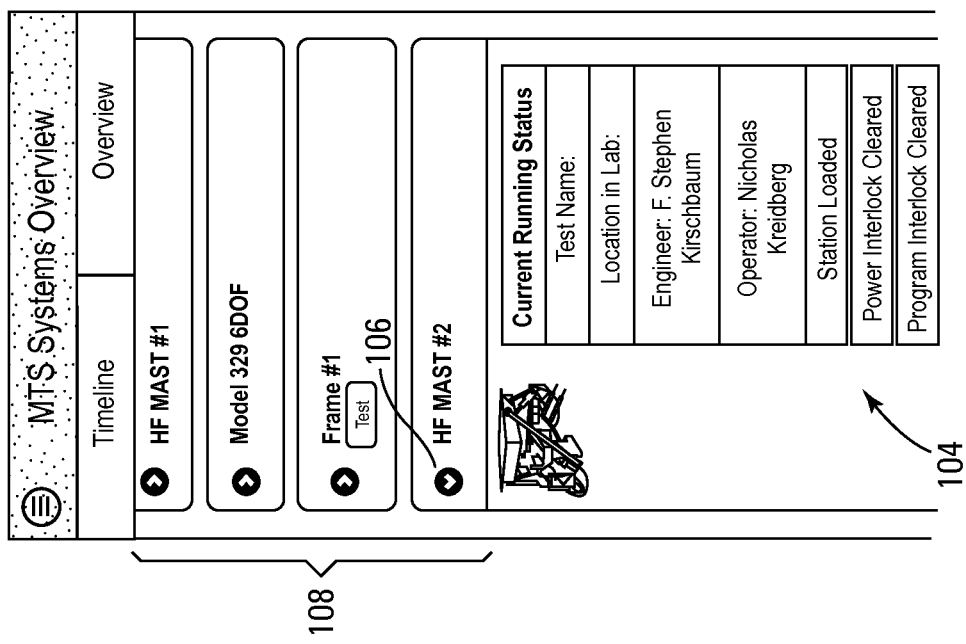
Fig. 11
Fig. 10
Fig. 9

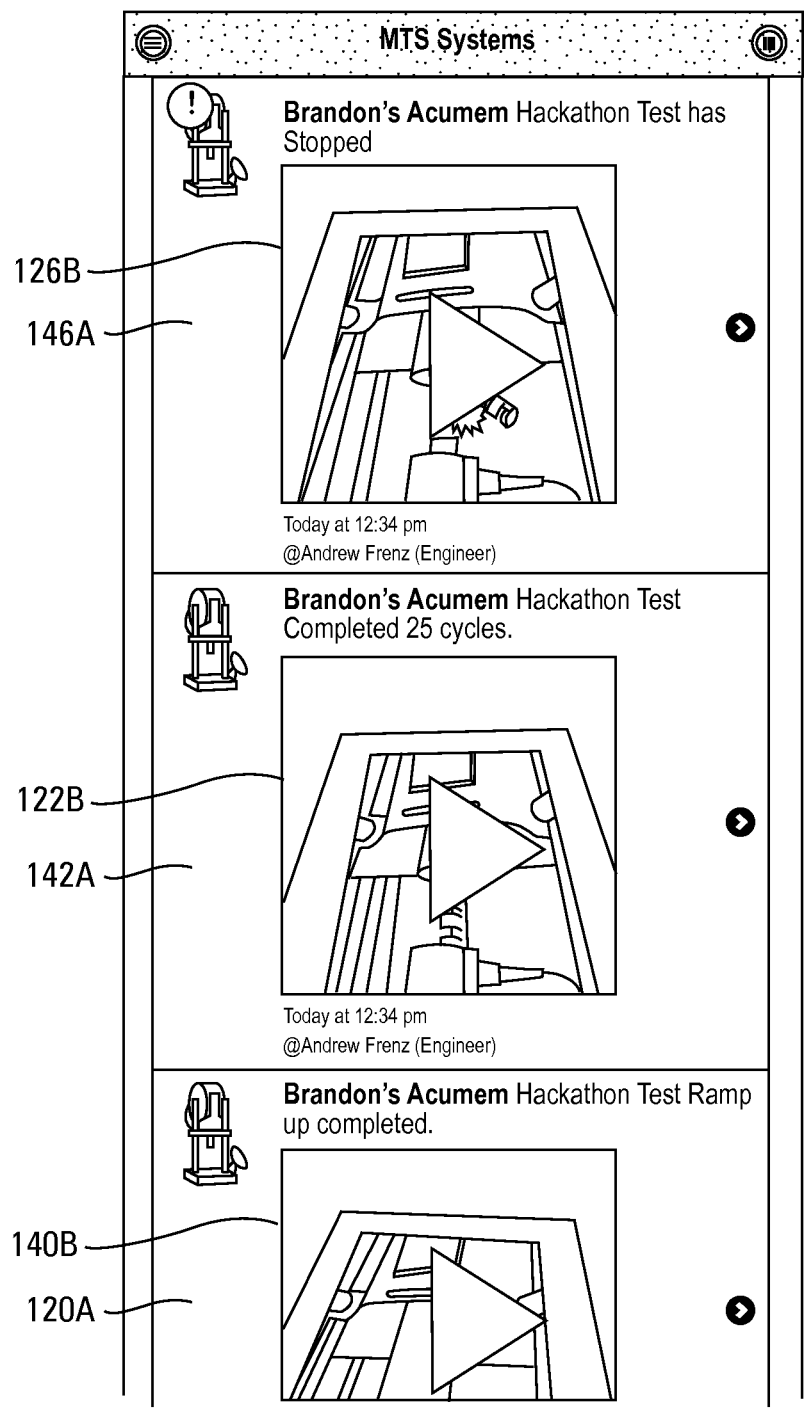

US 10,671,503 B2

MOBILE APPLICATION INTERACTIVE USER INTERFACE FOR A REMOTE COMPUTING DEVICE MONITORING A TEST DEVICE

RELATED APPLICATIONS

The present application is a continuation of and claims priority of U.S. patent application Ser. No. 14/502,031, filed Sep. 30, 2014, now U.S. Pat. No. 10,255,156, which claims the benefit of U.S. Provisional Application No. 61/884,928, filed Sep. 30, 2013, having the same title. The contents of both of which are hereby incorporated by reference in their entirety.

BACKGROUND

United States Patent Application Publication: US 2013/0212512A1, which is incorporated herein by reference in its entirety, describes a system or operating architecture that allows among other concepts described therein, an apparatus and method to provide remote access to data, and in particular test data and/or other information from a test machine used for example to test performance of consumer products, materials, components, structures, etc. Improvements regarding the data obtained from the testing devices and/or rendering such information to the user of a mobile or remote device in a manner that is convenient for the user is always desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention provides a method of remotely monitoring a test being performed upon a test specimen, comprising receiving information pertaining to the test, rendering on a display of a computing device remote from the testing device an information message having a first portion indicative of a testing device, a second portion indicative of information related to the testing device or a test being conducted on the testing device, and a third portion indicative of time that has elapsed since the second portion has occurred, and updating the third portion indicative of the time that has elapsed.

Another aspect of the invention provides a computing device, comprising an interface configured to receive information pertaining to a test performed on or related to a testing device, a storage device, a display, and a processor operably connected to the interface, the storage device and the display, the processor configured to receive information pertaining to the test; to render on the display an information message having a first portion indicative of the testing device, a second portion indicative of information related to the testing device or a test being conducted on the testing device, and a third portion indicative of time that has elapsed since the second portion has occurred; and to update the third portion indicative of the time that has elapsed.

Still another aspect of the invention provides a system configured to monitor a testing operation on a testing device, comprising an image capture device, and a computing device operatively connected to the image capture device to receive information on the testing operation from the image capture device, the computing device having a controller configured to receive information pertaining to the testing operation and to render on the display an information message indicative of parameters of the testing device at a selectable amount of progress through the testing operation.

Another aspect of the invention provides a system configured to monitor a testing operation on a testing device, comprising an image capture device, and a computing device operatively connected to the image capture device to receive information on the testing operation from the image capture device, the computing device having a controller configured to receive information pertaining to the testing operation; to render on the display an information message having a first portion indicative of the testing device, a second portion indicative of information related to the testing device or a test being conducted on the testing device, and a third portion indicative of time that has elapsed since the second portion has occurred; and to update the third portion indicative of the time has elapsed.

Yet another aspect of the invention provides a testing device; comprising a test platform having a controller operatively coupled to the test platform, an image capture device operatively coupled to the controller, to capture information pertaining to a test, the test platform, or a test specimen on the test platform, wherein the controller is configured to generate an information message having a first portion indicative of a testing device of the one or more testing devices, a second portion indicative of information related to the testing device or a test being conducted on the testing device, and a third portion indicative of time that has elapsed since the second portion has occurred.

Another aspect of the invention provides a mobile application tool including instructions stored on a computer storage medium and operable through one or more hardware components of a computing device, comprising a mobile test interface component configured to retrieve an information message, from one or more testing devices, associated with one or more tests operable on the one or more testing devices, and a display component configured to invoke a graphical user interface to display the retrieved information message, the information message having a first portion indicative of a testing device of the one or more testing devices, a second portion indicative of information related to the testing device or a test being conducted on the testing device, and a third portion indicative of time that has elapsed since the second portion has occurred.

Yet another aspect of the present invention provides a mobile data platform for monitoring a testing system including one or more testing devices operated through one or more controller units, comprising a communication platform to receive information on one or more tests operable on the one or more testing devices, and a display component configured to invoke a graphical user interface to display the received information, wherein the received information is determined by parameters identified by an individual user for that individual user.

Additional aspects of the invention include the following and may be combined with any of the above aspects and with each other as desired.

An aspect wherein the information pertaining to the test includes an indication of a test failure, and wherein rendering further comprises rendering an information message about the failure.

An aspect wherein the information pertaining to the test includes an image or video of the failure, and wherein rendering further comprises rendering a link to the image or video of the failure.

An aspect wherein the information pertaining to the test includes an image or video of the testing operation, and wherein rendering further comprises rendering a link to the image or video.

An aspect further providing receiving information pertaining to an alert pertaining to the test, the testing device, and/or a component associated with the testing device, and rendering the alert on the display.

An aspect further providing rendering on the display a series of information messages in a time ordered fashion such that each third portion of each information message in the series of information messages continues to indicate the elapsed time from the corresponding second portion of each information message as the information message is rendered on the display.

An aspect wherein the series of information messages relates to information provided by at least two different testing devices.

An aspect wherein the series of information messages relates only to testing devices, a component connected thereto, and/or communication between users authorized to monitor the information messages.

An aspect further providing associating graphical icons for information messages.

An aspect further providing associating images of a testing device with an information message for that testing device.

An aspect further providing receiving information from the user of the computing device indicating at least one parameter associated with the testing device, a component connected thereto, and/or communication between users authorized to monitor the information messages to be sent in an information message.

An aspect wherein the processor is further configured to receive an image or video associated with the testing operation, and to render on the display the image or video associated with the testing operation.

An aspect wherein the image capture device is configured to capture images of the testing operation, and to convey to the computing device images associated with the testing operation.

An aspect wherein the image capture device is configured to convey images associated with a failure of the testing operation to the computing device upon the failure.

An aspect wherein the image capture device is configured to capture a video of the testing operation, and to convey to the computing device video associated with the testing operation.

An aspect wherein the image capture device is configured to convey video associated with a failure of the testing operation to the computing device upon the failure.

An aspect wherein the controller is further configured to render on the display an alert for a condition of the testing device.

An aspect wherein the tool includes an alert function which when activated retrieves alert notifications for the one or more testing devices.

An aspect further providing an alert function to provide an information message indicating a completion of a test cycle or test for a testing device of the one or more testing devices.

An aspect wherein the received information is rendered on the display component and includes an information message having a first portion indicative of a testing device, a second portion indicative of information related to the testing machine or a test being conducted on the testing device, and a third portion indicative of time that has elapsed since the second portion has occurred.

An aspect wherein the received information third portion is updated indicative of the time has elapsed since an event associated with the information message has occurred.

Other aspects of the invention include a computing device, a system, and/or a mobile tool for implementing any of the methods of claims 1-11.

BRIEF DESCRIPTION OF THE DRAWINGS

FIG. 2 illustrates a screen shot of a parameter selection according to another embodiment.

FIGS. 3, 4, 4A-4B, and 5-12 illustrate screen shots according to other embodiments.

FIGS. 13-19 illustrate screen shots according to other embodiments.

DETAILED DESCRIPTION

Figure 1:
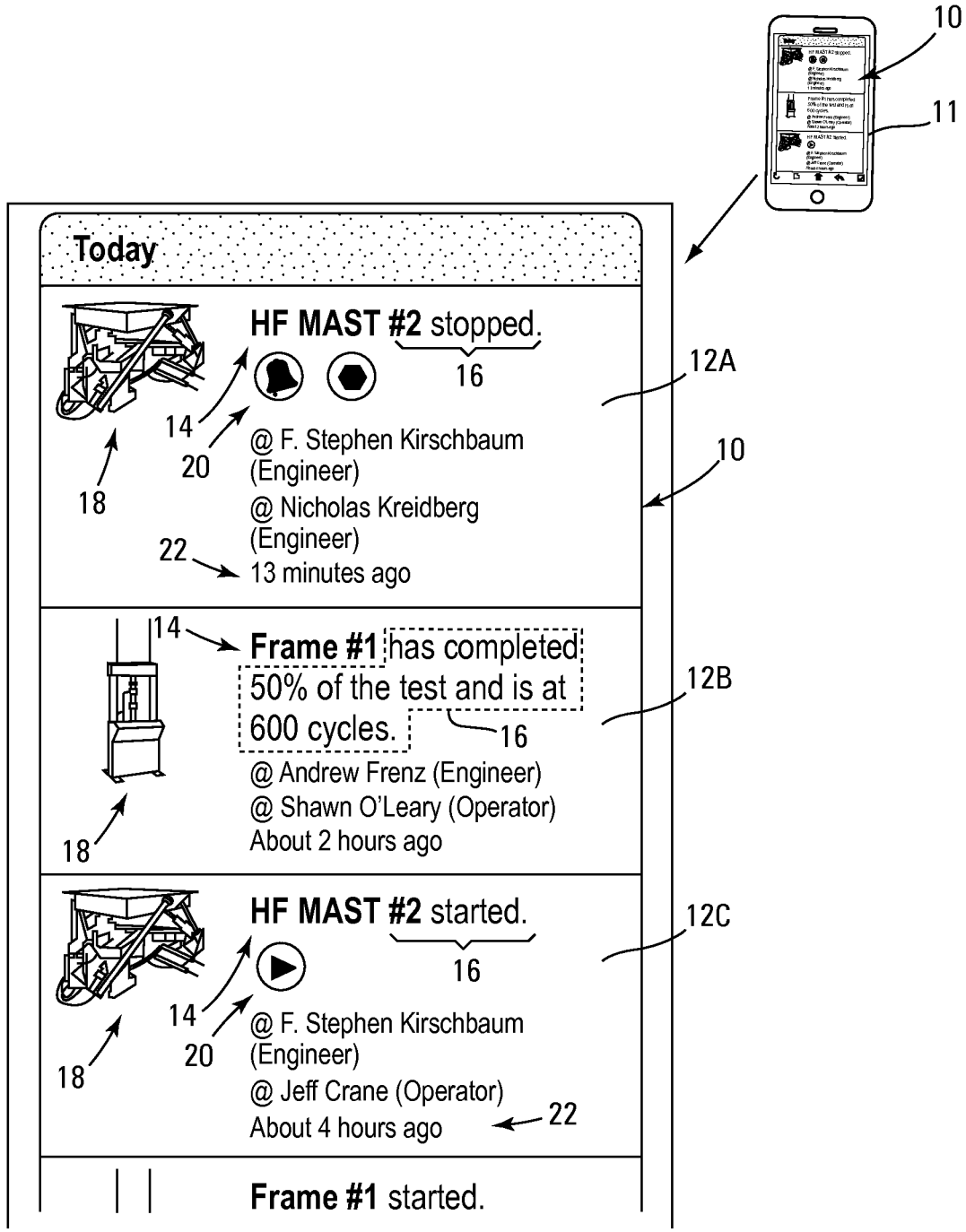
FIG. 1 illustrates an embodiment of a mobile device and rendered display.

An aspect of the present invention is a user interface 10 that provides information related to changes in one or more testing devices such as those illustrated and described in US 2013/0212512A1. By way of example, the user interface 10 can be rendered on any suitable computing device 11 such as mobile phone 156, tablet computing device 157, portable computing device 158 (the aforementioned all being examples of "mobile" computing devices) or other computing devices remote from the test devices as illustrated and described in US 2013/0212512A1. It should be noted that although the user interface discussed herein is suitable for the architecture illustrated and described in the afore-mentioned US published patent application where the remote computing devices communicates with a remote test platform or cloud computing platform using any wired or wireless communication link, the user interface 10 can be rendered on any of the afore-mentioned computing devices that is also in direct communication with the testing device(s) such as a system controller 134 or other computing device such as 1120 described below and associated with the testing device(s). The remote computing device in one embodiment is not the computing device used to conduct a test on or to control the testing device, such as a mobile device as described above or a desktop computer receiving information from a local area network or wide area network. The "remote" computing device is not in close proximity to the testing device in one embodiment.

The user interface 10 comprises a time-ordered sequence of rendered information messages herein exemplified as 12A, 12B, 12C. Each information message 12A-12C typically is associated with a single test device or apparatus. Referring to information message 12A by way of example, each message typically includes a test device identifier 14 and an associated descriptive action portion 16, which together provide the user of the remote computing device a brief and convenient description of which testing device the message pertains to and the action or event that has occurred. As illustrated, each information message 12A-12C can further include a representative graphical image 18 such as a small picture of the testing device, or a picture representing the testing device. The graphical image 18 also aids the user to correctly associate the actual testing device to the information message. The graphical image 18 can be stored in memory on the remote computing device and rendered together with the information message. In this embodiment, the processor of the remote computing device can process some identifier in or associated with the information message received by the remote computing device in order to obtain the correct graphical image stored therein. If desired, the graphical image can be sent by the testing device with the other information comprising the information message.

If desired, software modules used to render each of the information messages can further render one or more graphical icons 20 which can further aid the user in ascertaining the action that the testing device has taken. For instance, a stop sign graphical icon can indicate, as illustrated in information message 12A, that the associated testing device has stopped, while a graphical icon indicative of an arrowhead, as illustrated in information message 12C, can be used to indicate that the associated testing device has started operation of a test. As with the graphical image 18, the graphical icon 20 can be sent with the other information comprising the information message and/or be rendered by the processor of the remote computing device based on the descriptive action 16 or other icon identifying sent with information comprising the information message.

Other graphical icons can be further rendered if desired. Referring back to information message 12A, a graphical icon illustrating a bell indicates that an alert has been sent typically using a different form of communication such as via email, text message, etc. The alert is typically associated with an event that the remote computing device user or others are particularly concerned with. The alert graphical icon can indicate to the user the importance of the event as well as indicate that others interested in operation of the testing device will receive the alert message as well.

Each information message 12A-12C further includes an elapsed time indicator 22 indicative of the amount of time that has lapsed since the occurrence of the change in status of the testing device indicated by identifier 14 and descriptive action 16. Unlike a message such as an alert or other message that would include a time stamp that is rendered, the elapsed time indicator 22 can be considered a more readable format that conveys to the user the amount of time the has elapsed since the event has occurred, which again can be of aid in ascertaining the importance of the information message.

In a preferred embodiment, the amount of time that has lapsed in portion 22 indicated in each information message 12A-12C is continually updated and rendered on the user interface 10 if the information message is displayed. Therefore, even if no new information messages are received for a period of time, the elapsed time indicator 22 will increase with time. Typically, values rendered comprising whole numbers of minutes and/or hours and/or fractions thereof since the activity indicated in the information message has occurred is sufficient; however, if desired time elapsed as measured in seconds, days and/or weeks, etc. can be rendered, if desired or needed by the testing device and/or the test being performed thereon. For instance, if the event is in a preceding day, the portion 22 could refer to previous days such as but not limited to 'Yesterday at 2:35" or "Tuesday at 4:50 pm". Likewise, the time portion could refer to a specific day, particularly, when it is a preceding day, for example, greater than a week, e.g. "September $3^{rd}$ at 12:04 am". It should be noted that the time indicator can further comprise in the alternative or in addition a time stamp indicative of when the event took place.

In the embodiment illustrated individuals responsible for the testing device or the test being conducted on a testing device can also be included in the information message. For example, F. Stephan Kirschbaum is the engineer responsible for the tests being conducted on testing device "HF MAST #2" in information message 12A, while the operator conducting the test is Nicholas Kreidberg. In this manner, the user of the computing device having the user interface 10 can easily ascertain which individual to contact concerning the event and/or testing device associated with the information message.

As indicated above, the information messages 12A-12C are arranged in a sequence with the most current information message displayed at the top of the user interface 10. Those information messages that have occurred earlier may or may not be displayed on the computing device with the latest information message. Earlier information messages however can be rendered to the user by scrolling through the time ordered sequence of information messages using a suitable input device such as a pointing device (e.g. mouse, physical button, visually rendered button on the display, etc). In the embodiment illustrated where the user interface 10 is rendered on a smart phone 11 having a pressure sensitive screen, the user can simply use his or her finger to scroll up or down through the information messages.

Referring to FIG. 2, an embodiment of the user interface 10 can also comprise information messages related to periodic updates concerning the test being conducted on the testing device. Information message 12B is exemplary. In this example, the information message 12B conveys that the test device "Frame #1" has completed 50% of the test being conducted thereon and is at 600 cycles through the testing procedure. The periodic update frequency for each testing device of interest to the user can be accessed through a suitable menu such as illustrated at 40 that can be rendered on the computing device. In the embodiment illustrated, the user can adjust the time period by entry of values in input boxes 42 and 44. The user can select any or all of the information pertinent to the testing device at input box 46. Selection boxes 48 and 50 turn off or on the periodic updates, respectively. Upon completion of the data entry via menu 40, information concerning the requested periodic updates is sent to the computing device or controller of the testing device, directly or via a server platform as described in the aforementioned published US patent application in order to incorporate the requested updates in the testing procedure and send them accordingly. It should be noted that the requested updates can be associated with the remote computing device user such that the requested periodic updates are sent only to the requesting remote computing device user and not to other remote computing device users. The information generated by the computing device or controller of the testing device for each information message can include identifying information as to which remote computing device user is to receive the information message and/or the server platform in the aforementioned US published patent application can control which information message is sent to each remote computing device.

Figure 3:
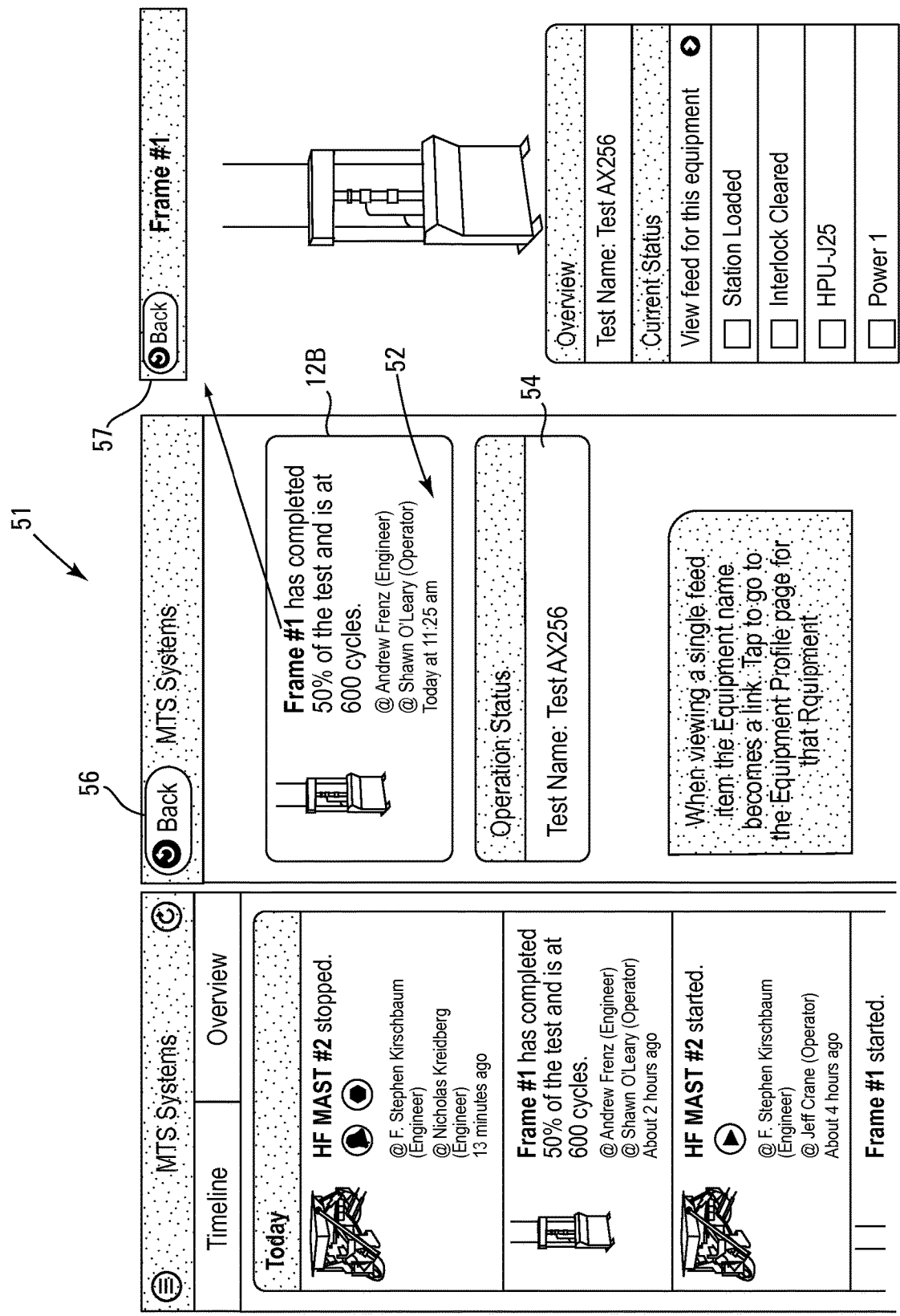

Referring to FIG. 3, in another embodiment, additional information related to the information message being rendered in the time sequence can also be obtained. In the embodiment illustrated, selecting information message 12B on user interface 10 would render additional information illustrated in screen shot 51. In the embodiment of the user interface 10 on a smart phone 11, screen shot 51 would replace the timeline sequence of user interface 10. In screen shot 51, the information message 12B is repeated; however, if desired, a time stamp indicative of the time in which the event for the information message occurred can be provided such as at 52. The additional information conveyed to the user can take any number of forms. In this example, the additional information includes identifier 54 indicative of the test being conducted on the testing device associated with information message 12B. Operation of button 56, which can be a physical button or a button rendered on the display, returns the computing device to displaying the timeline sequence of user interface 10. In yet a further embodiment illustrated in screen shot or page 50, this page can include a link (e.g. the equipment name) to a profile page 57 for the equipment. This page 57 is a focused view for a specific piece of equipment, with real-time indicators of the current status, other high level status, and links to related information. For example and not as a limitation additional links can include a links to User Documentation for that specific equipment, when it was last serviced, it's specification such as maximum load capacity, etc. In another embodiment, an equipment picture, name and high level information may all be displayed on the main screen of the display, and tapping takes a user directly to a screen such as screen 57.

Figure 4:
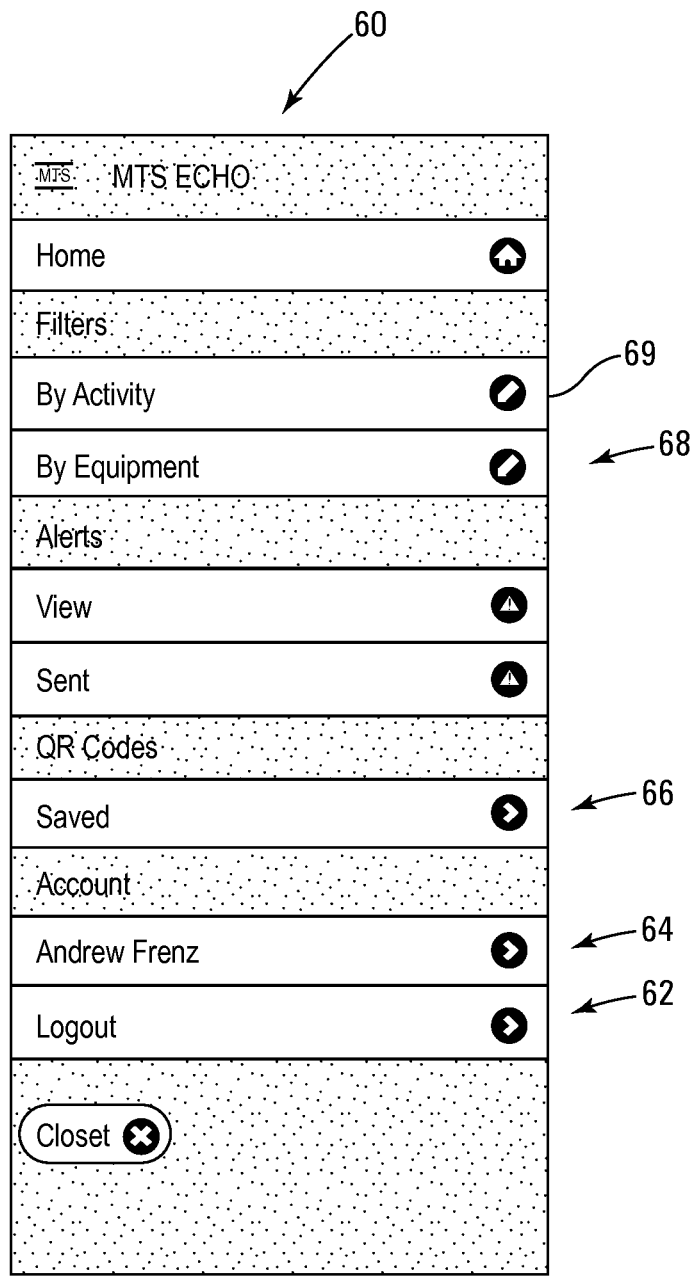

FIG. 4 illustrates an exemplary menu of another embodiment that allows the user to access parameters that are used by the software module executed by the processor of the computing device 11 generating user interface 10. Menu 60 can include account information of the user and the ability to log in or activate the software module so as to receive information messages at 62. "Logging in" typically establishes a communication link with the server and/or the computing device or controller of the testing device. Input selection 64 allows the user to enter information or otherwise access information pertaining to his or her account. As described in US Published Patent Application 2013/0212512A1, ID or identifier codes associated with each physical testing device such as a bar or QR code can be used by the user of the computing device to identify which testing device he or she would like to monitor. In the embodiment illustrated these ID codes comprise QR codes which are accessible by input selection 66.

Figure 4A:
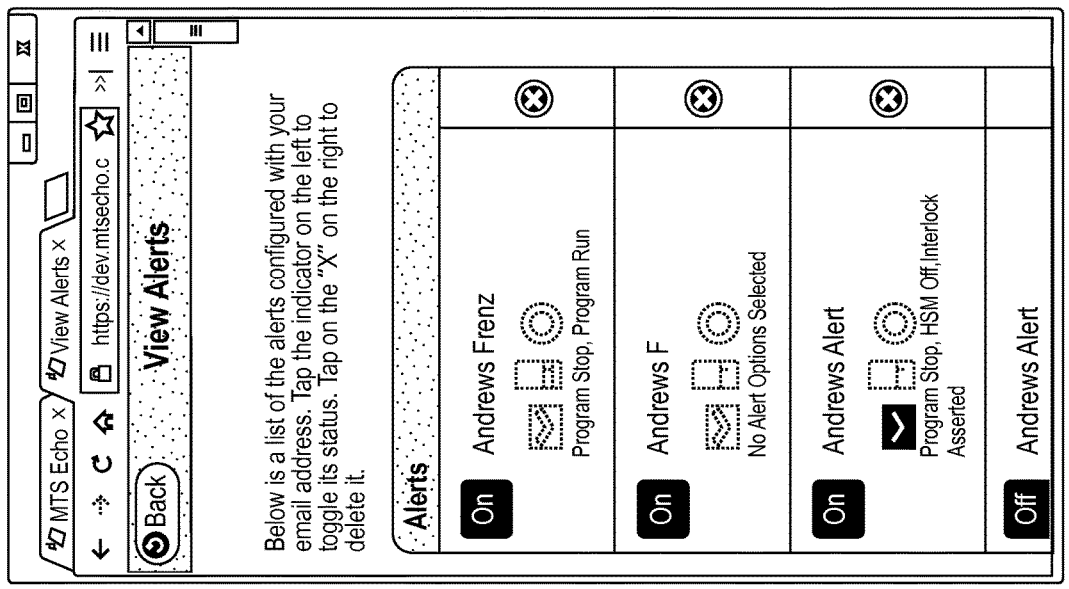

In FIG. 4, the "View" selection under "Alerts" when selected renders a screen like that illustrated in FIG. 4A. From this screen, the remote computing device user can set up alerts, where an alert is a communication sent by another method such as but not limited to by email or text message. In this manner, if the user it at his desktop and/or does not have his or her remote computing device phone powered, or the remote monitoring application enabled, the user will receive the alert message. From this screen, the remote computing device user can easily toggle alerts on or off as desired once they have been set up on a suitable menu not shown. Changing the alert status, typically is sent to the computing device or controller of the testing device and/or the server so that alerts are sent out through the other communication modes as needed.

Figure 4B:
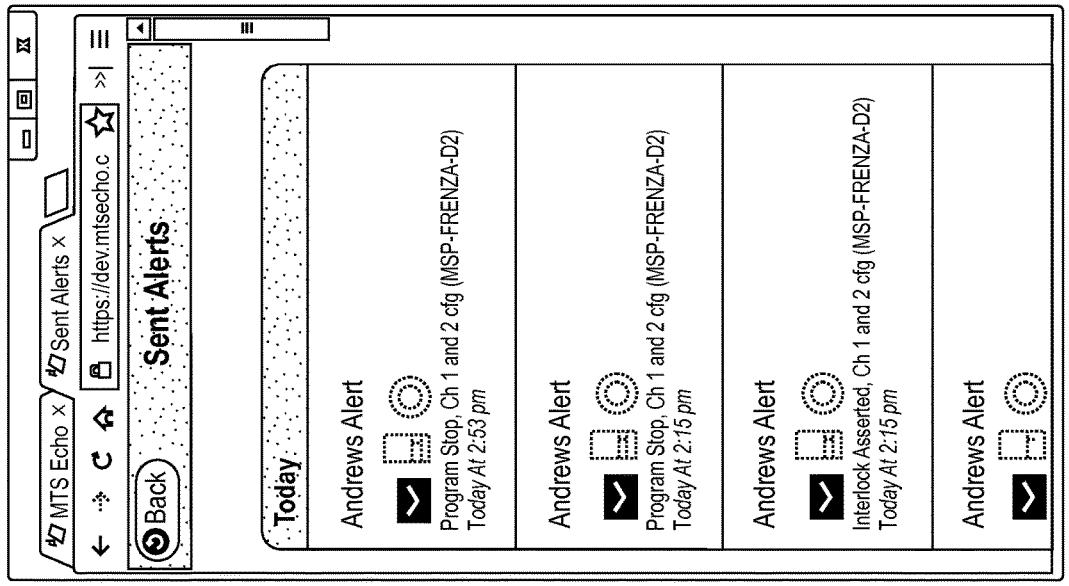

In FIG. 4B, the "Sent" selection under "Alerts" when selected renders a screen like that illustrated in FIG. 4B in one embodiment. This screen allows the remote computing device user to see the alerts that have been sent out, commonly in reverse chronological order, although if desired any desired order can be provided as requested by the remote computing device user.

Figure 5:
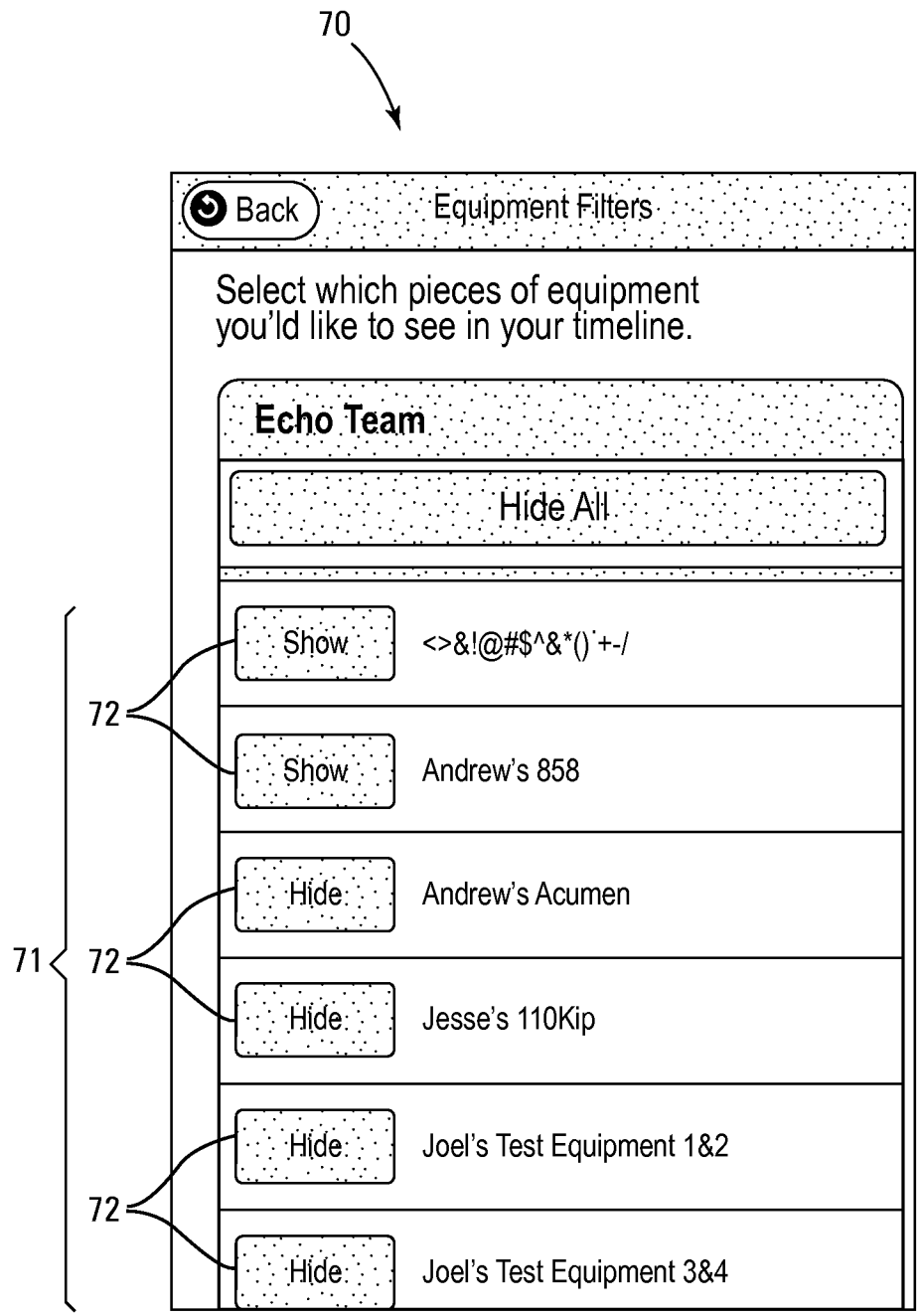

A particular advantageous feature of the user interface 10 is the ability of the user to adjust or change which test devices the user is interested in monitoring. In other words, the user interface 10 indicates which testing devices the user wants to receive information messages related thereto. In menu 60 the user can indicate by selection of menu item 68 the equipment or which testing devices to receive information messages from. Activation of button 68 can comprise in one embodiment an input signal to the software module executing on the remote computing device to render a menu 70 such as illustrated in FIG. 5. Menu 70 can include a listing 71 of all the testing devices (scrollable if necessary) that the user has selected or is authorized to monitor. In the embodiment illustrated, for each test device an associated button 72 is provided that can be activated or deactivated depending upon the users desire to monitor the associated testing device.

Figure 6:
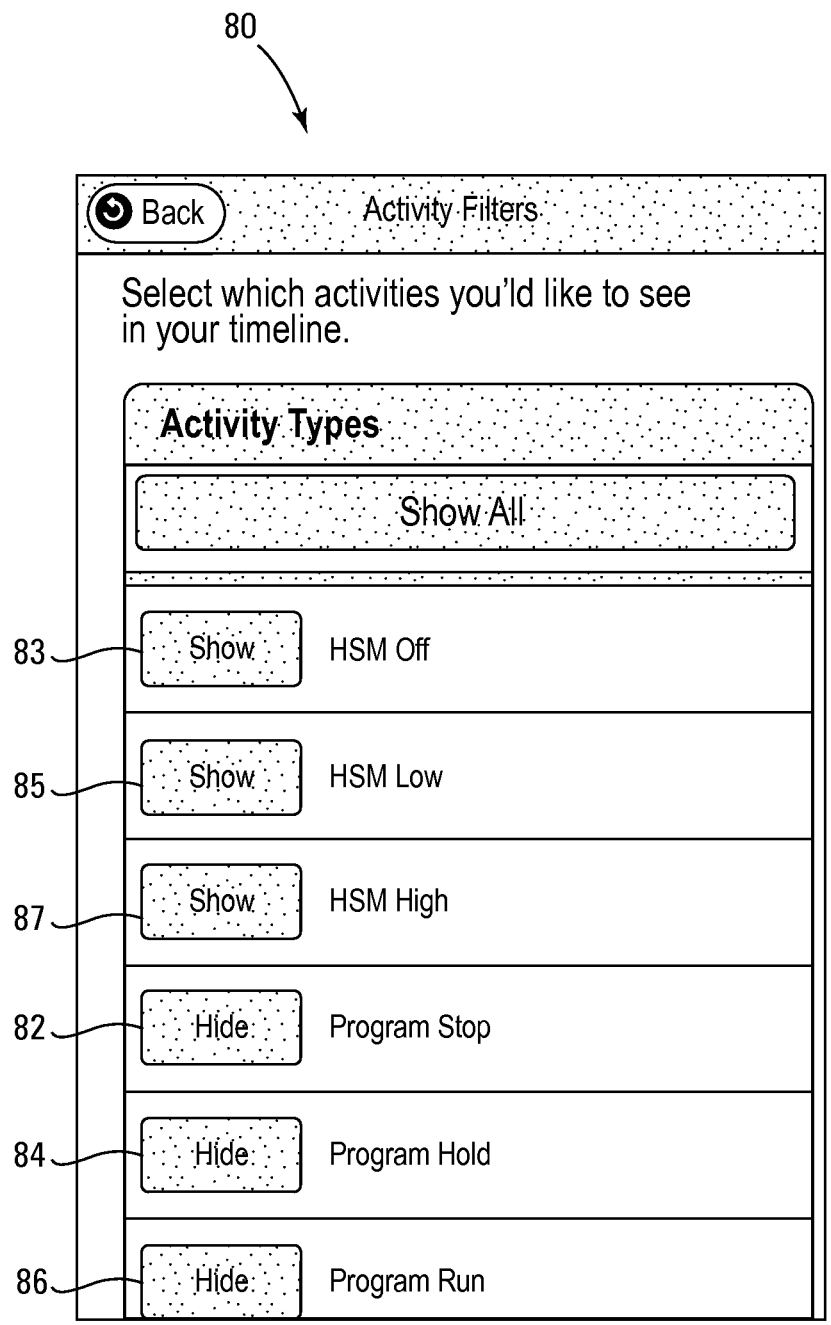

Referring back to FIG. 4, in one embodiment menu 60 can also include a selection button 69 to allow the user to identify which types of information or activities of the testing device(s) that the user desires to monitor. Activation of input selection 69 can render a menu 80 as illustrated in FIG. 6. Generally, the activities can be grouped for example based upon the status of the test being conducted on the testing device such as indicated by activities associated with buttons 82, 84 and 86 or information associated with operational status of components of the testing device such as activities associated with buttons 83, 85 and 87. Selection of buttons 82, 84 and 86 allow the user to enable or disable information messages being rendered on the user interface related to when the test program stops, is on hold, or is running, respectively. Likewise, buttons 83, 85 and 87 allow the user to enable or disable rendering of information messages pertaining to the operational status of a physical component of the testing device, herein illustrated as the hydraulic service manifold "HSM." As appreciated by those skilled in the art these are just but a few examples and will vary depending upon the test being conducted and/or the various physical components comprising the testing device. The information pertaining to which testing device(s) the remote computing device user would like to see corresponding information messages (as selected from menu 70) as well the information messages for the particular activities (as selected from menu 80) can be stored in memory of the corresponding computing device or controller of the testing device or in memory of the server connected thereto with respect to the remote computing device in the system of the aforementioned US published patent application wherein the processor of the computing device or controller of the testing device or the processor of the server access this stored information in order to generate and send the information message to the remote computing device. In another embodiment, the information pertaining to which testing device(s) the remote computing device user would like to see corresponding information messages (as selected from menu 70) as well the information messages for the particular activities (as selected from menu 80) can be stored in memory of remote computing device wherein the processor of the remote computing device accesses this stored information in order to render the information message on the remote computing device 11. In yet another embodiment, final rendering of the information message on the remote computing device can be due to a combination of whether the information message is generated on a computing device remote from the computing device 11 and/or whether, if received by the remote computing device 11, the information message is rendered on user interface 10 by the processor of the remote computing device 11.

Figure 7:
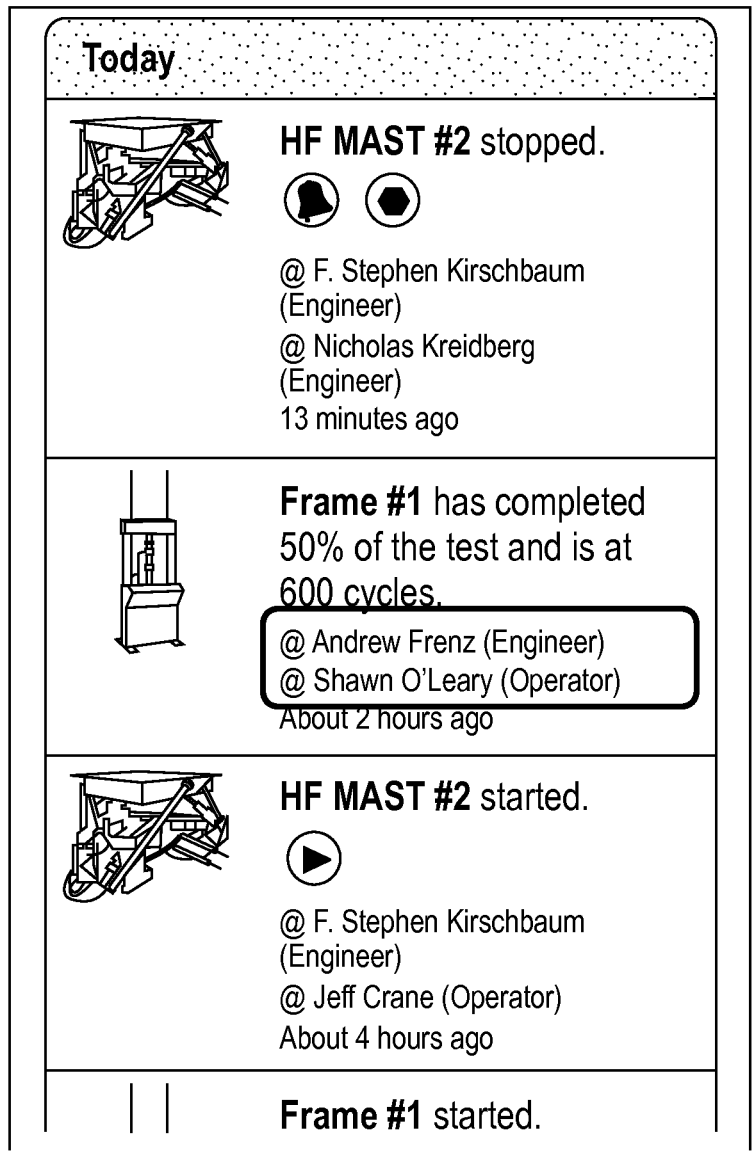

Referring to FIG. 7, as indicated above the information message can include for example names of individuals related to the associated testing device. Although not illustrated in menu 60 of FIG. 4, it should be noted that if desired a filtering button can be provided in menu 60 to identify to the user that he or she can receive information messages from testing devices based upon the individuals associated with the testing devices. Hence, if desired, the user can indicate that he or she desires to receive information messages for testing devices associated with one or more particular individuals associated with various testing devices. This is particularly advantageous for the user to use to only view activities and equipment of things that he or she is assigned as an operator, engineer or lab manager, in which case the manager could for example list specific equipment, operators and/or engineers.

Figure 8:
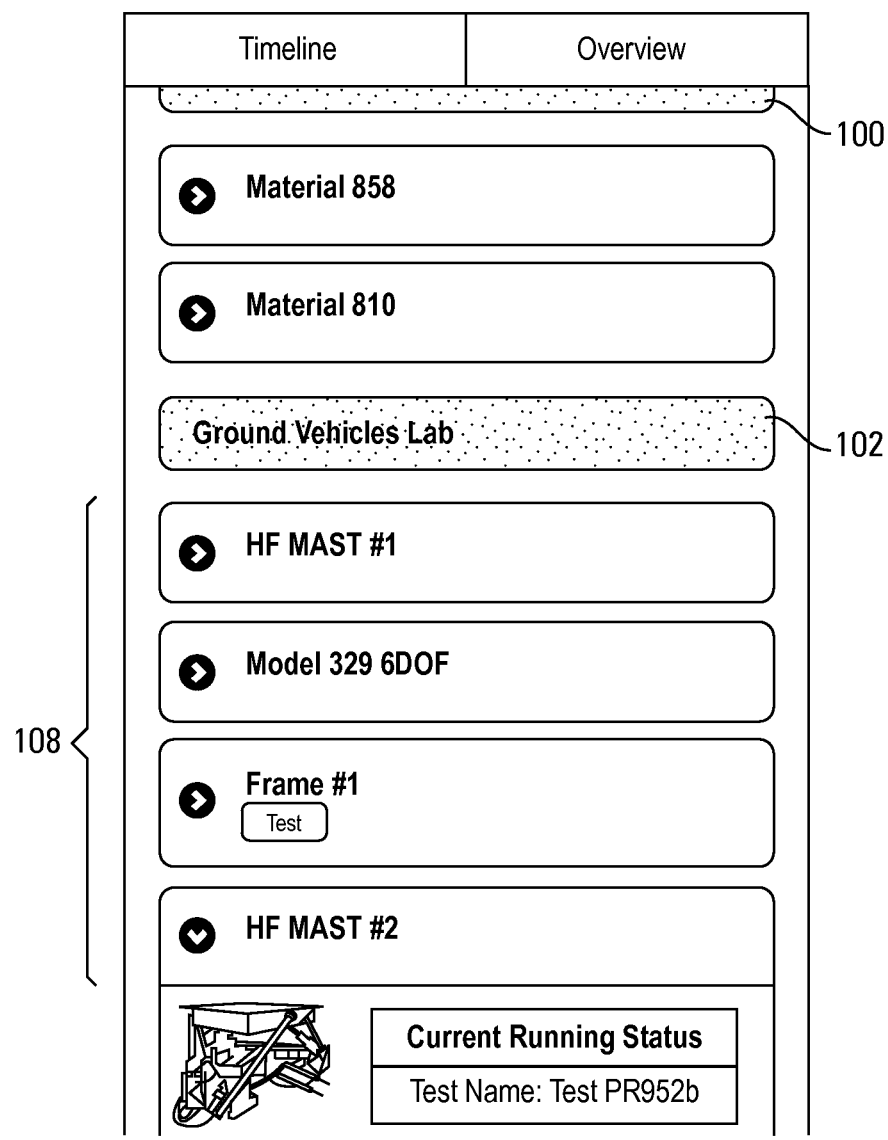

Referring to FIGS. 8-11, user interface 10 can also include in various embodiments an overview display that lists each of the testing devices that the user of the computing device is interested in or authorized to monitor. Referring to FIGS. 8 and 10, the testing devices can be grouped together, for example, based on testing location, such as which laboratory, with user adjustable identifiers 100 and 102 as needed. In the example illustrated, two testing devices are associated with location identifier 100, while four testing devices are associated with location identifier 102.

Each listed testing device is in fact a user selectable button whereupon activation by the user, the user will obtain additional information regarding the testing device such as illustrated in FIG. 9 at 104. Generally, the detailed information can include the current running status of the testing device, the test being conducted, if any, the location in the laboratory of the testing device as well as the associated individuals relevant to the testing device or the test being conducted on the testing device including parameters of the testing device identified by operational identifiers generally indicated at 108. The operational identifiers can be color coded to indicate whether or not the particular parameter of the testing device is enabled or disabled. Likewise, each of the identifiers having the testing device name and comprising the user selectable buttons (for example at 106) can also be color coded to indicate the operational status of the testing device. For example, if a testing device is not running a test the user selectable button for the testing device can be red, while if the testing device is operating a test, the user selectable button can be identified as green.

Figure 12:
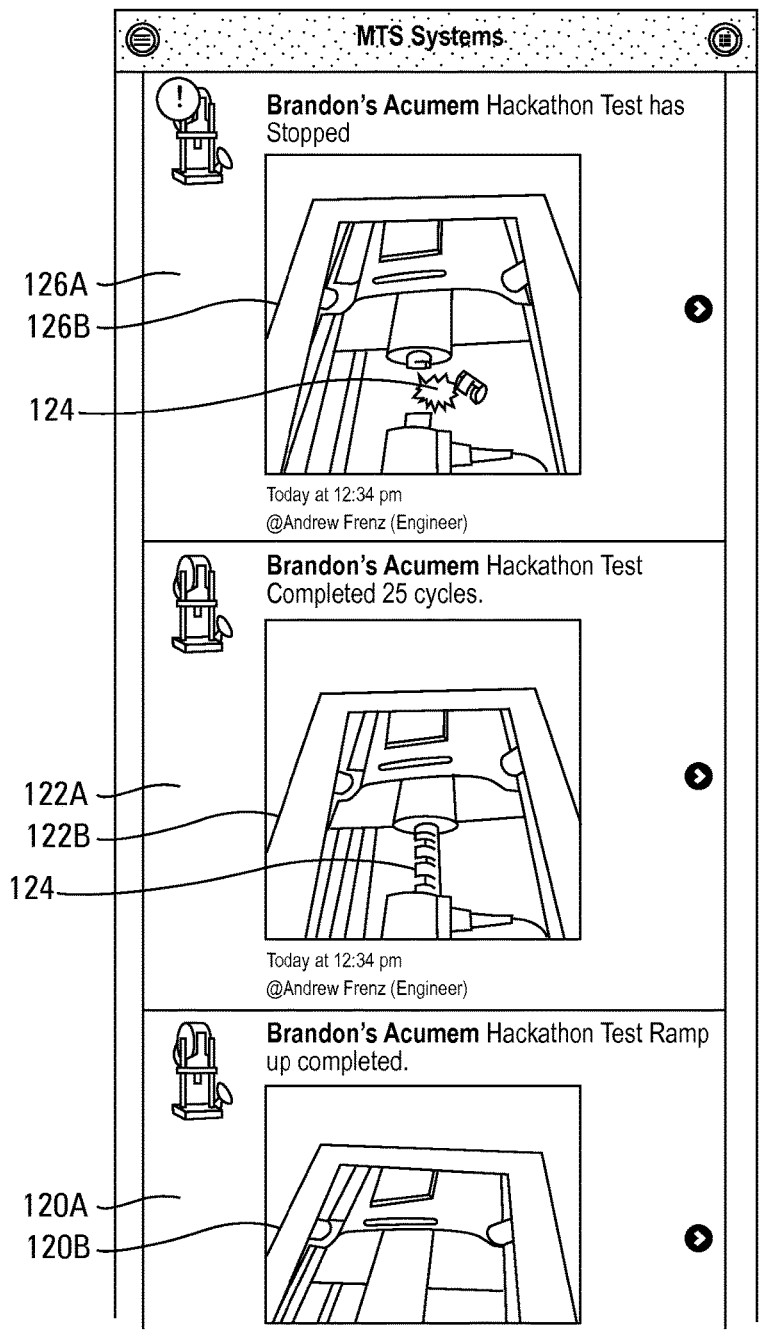

One particularly advantageous and informative information message is illustrated in FIG. 12. Specifically, if desired, the information message can include a photo or picture taken by a camera located proximate the testing device so as to provide a picture of the testing device, a component thereof, and/or the test specimen under test. In the examples provided information message 120A is indicative of a first portion of a test sequence performed on a test specimen being completed with an associated photo 120B (which in the illustration of FIG. 12 is incomplete). Likewise, information message 122A is another information message indicative of another portion of the test sequence being completed and a photo 122B of the test specimen 124 under test. Information message 126A is indicative of the test stopping with the associated photo 126B. In information message 126A, the test specimen 124 has failed or broke which thereby stopped the test.

Figure 12A:
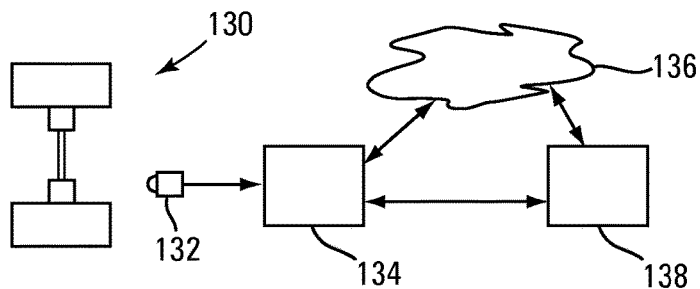
FIG. 12A illustrates an embodiment of a system according to another embodiment.

FIG. 12A schematically illustrates one embodiment of a system to which the information messages 120A, 122A and 126A pertain. In FIG. 12A the testing device is indicated at 130 while an image capture device such as camera 132 is arranged so as to take images of the testing device, a component thereof, and/or the test specimen under test. Camera 132 is operatively connected to a controller 134 or other computing device associated with testing device 130. Computing device or controller 134 can communicate with a cloud based server platform 136 which in turn communicates with the mobile or otherwise remote computing device 138 upon which the information messages 120A, 122A and 126A are rendered. This architecture or system configuration is similar to that described in US published patent application 2013/0212512A1. However, it should be noted that in an alternative embodiment the remote computing device 138 can be operably connected directly to the computing device 134 of the testing device 130 either through wireless and/or wired direct communication links, i.e. without a server platform as described in US published patent application 2013/0212512A1, or at least not providing all the functionality described therein.

It should be noted that the information messages 120A, 122A and 126A can be configured so as to render the image with rendering of the information message. In the alternative, a user activated button or URL "universal resource locator" link can be rendered in the information message and selected by the user, wherein upon selection the remote computing device then accesses or downloads the associated image from a storage device remote from the computing device such as in the cloud based server 136 or the computing device 134 associated with the testing device 130 to obtain the requested image.

In a manner similar to providing a static image in the information messages, FIG. 13 illustrates that information messages can include user selectable buttons or links to video sequences pertaining to the associated information message. In FIG. 13, the same events as described with respect to information message 120A, 122A and 126A are illustrated; however, in this form of information message, a user selectable image 140B, 142B and 146B are associated with a video sequence pertaining to the event that caused generation or rendering of the information message. The video sequences 140B and 142B can, for example, be indicative of the last few seconds before completion of the indicated portion of the test sequence. In one embodiment this is achieved by recording continuously into a circular storage buffer that can hold 5, 10, or X seconds of video. When the event occurs, the video from the circular buffer is stored as an individual clip. In this manner, the previous 10 seconds of footage are always available, so when an event occurs, the 10 seconds leading up to the event are available and can be stored. A variable amount of time after the even can also be recorded to capture the "before" and "after" of the event. Information message 126A pertains to the testing device stopping and selection of the user selectable image 146B causes generation or rendering of the associated with a video sequence, which could include showing the test being stopped and/or the specimen failing.

The same components as illustrated in FIG. 12A can be used to capture and store the video sequences for the information messages. In one embodiment, all the video can be stored in the computing device of the testing device 130, the server 136 and/or even in the remote computing device 138 and accessed as needed to render the information message. In another embodiment, the video can be stored in a circular storage buffer of any of the aforementioned devices with the relevant video sequence portion saved or otherwise made accessible for association with the information messages generated and sent to the remote computing device or rendered thereon. In an additional embodiment, one large video file can be captured, or large partitions. An index into this file can be stored at the time of the event, allowing a variable time before and after the event to be viewed remotely.

Figure 14:

In the illustrated example of FIG. 14, testing device HF MAST #2 is being monitored remotely by two different users using two different remote computing devices. In this example upon receipt of information message 150, the remote monitoring user, Andrew Frenz, entered a comment to be associated with information message 150. His comment is indicated at 152. Upon entry of any comment, the information message 150 can be augmented to include an icon 154 indicating that a comment is now associated with information message 150. In this example, the operator, Nicholas, having probably noticed that his information message 150 on his remote computing device now includes the graphical icon 154. Upon his selection of the information message 150, he can respond to Andrew Frenz's comment 152 as indicated at 156. Any number of comments can be entered by any remote computing device user monitoring the testing device HF MAST #2. In this example, the comments are entered by selecting the information message 150 whereupon the remote computing device generates or displays details of the testing devices such as illustrated in screen shot 158. Typically, the comments 152, 156 are stored in association with the information message (which is also stored) on either the computing device or controller of the testing device and/or the server in communication therewith as described in the system of the aforementioned US published patent application.

Figure 15:
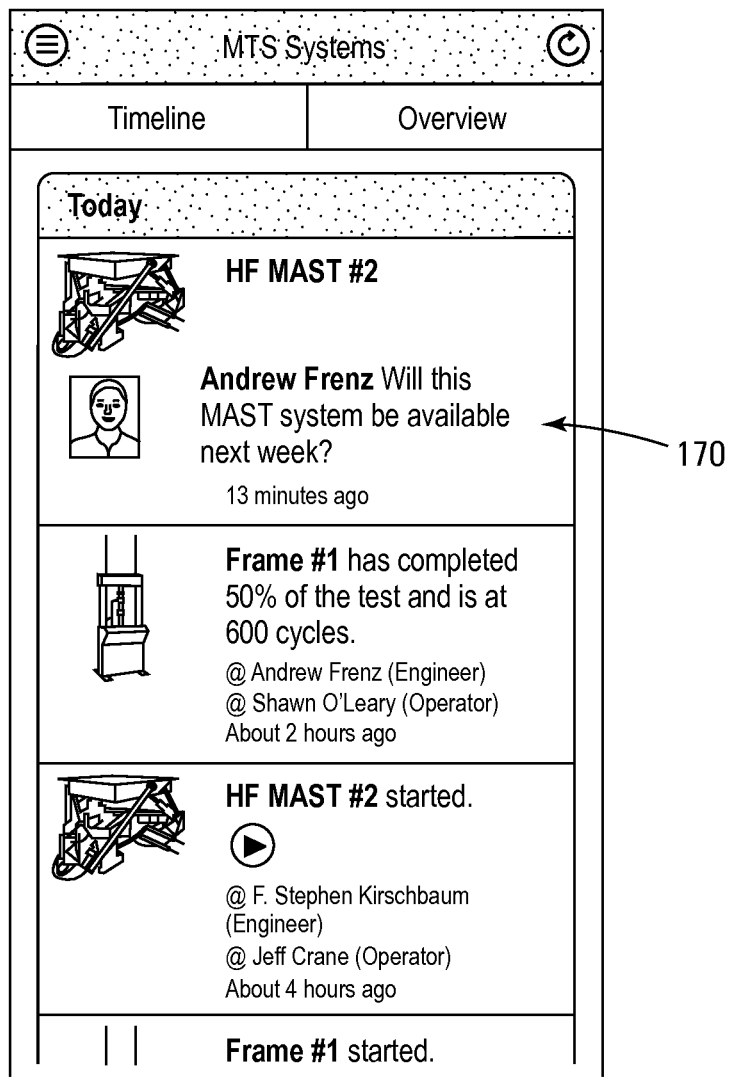
Figure 16:
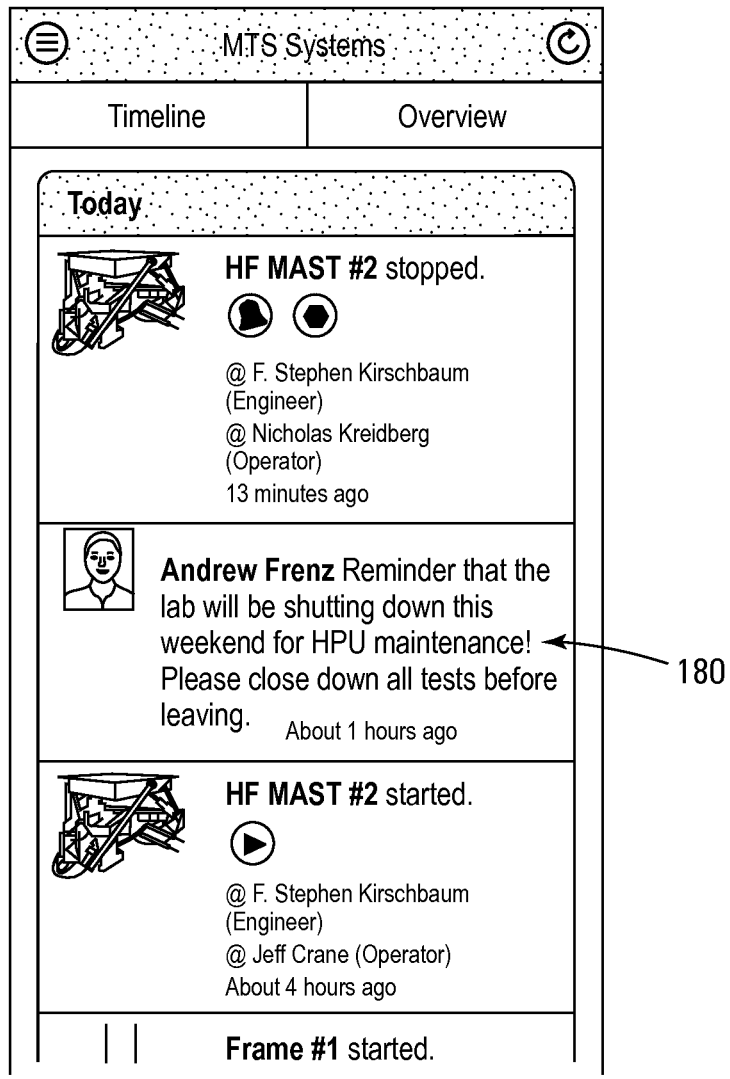

FIG. 15 illustrates another form of information message 170 herein pertaining to a particular testing device HF MAST #2. In one embodiment, the remote computing user can access the associated equipment for example as available in the overview view displays of FIG. 8-11 where the remote computing device user can select the particular testing device to post a comment related thereto. The comment can remain associated with the particular testing device such that any other user upon selection of the testing device from the overview menu, or any remote computing device user monitoring the testing device for information messages would then see the comment that has been posted. Typically, the information message comment 170 is stored in association with the corresponding testing device on either the computing device or controller of the testing device and/or the server in communication therewith as described in the system of the aforementioned US published patent application. FIG. 16 illustrates another form of information message 180 that is rendered to any remote computing device user. In this example, the information message 180 does not pertain directly to any specific testing device, but rather, to the testing laboratory in general. The information message again is stored on either the computing device or controller of the testing device and/or the server in communication therewith as described in the system of the aforementioned US published patent application.

Figure 19:

At this point it should be noted as illustrated in FIG. 19 that rendering of information messages is commonly displayed in reverse chorological order (i.e. the latest first); however, in other embodiments it may be advantageous to render them in a different order such as "pseudo-chronological" order, i.e. where at some are rendered in a chronological (reverse chronological) with others for example taking priority. For example, based on some indication of priority, the remote computing device could render information messages based on priority. The priority indication can be associated with the information message itself (either explicitly being rendered as such, or be associated with the information message but the indication not necessarily rendered. The indication of priority can be assigned at the testing device, i.e. by the operator of the testing device, by encountering an information message element in the test procedure (discussed below), by the sender of the information message either actively marking it as such, Priority could also be based upon the sender's name, position in company, or relation to the testing machine or test being performed. This priority can be determined by processing the information message, which can occur on the computing device or controller of the testing device, the server platform and/or the remote computing device. The priority of information messages can be determined by combinations of any of the above as well.

The priority information message can remain displayed as the first information message on the display, or otherwise near the top of the reverse chorological order for a set period of time such as but not limited to being set by sender of the information message, the remote computing device user, and/or until being acknowledged or viewed by the remote computing device user.

Some of the information messages discussed above such as information message 12A, 12C are based on the operational status of the testing device, for example, when the testing device stops or is started. As discussed with respect to FIG. 2, the user of the remote computing device can indicate that he or she desires periodic updates regarding the tests being performed. The remote computing device will take as input the parameters regarding the periodic updates such as the testing device name or other identifier, how frequently updates are to be provided, and the content of the information to be contained in the information message and communicate that information back to the testing device such as the system controller of the testing device or other computing device connected thereto so that when the test program being run on the testing device reaches the end of the time period selected, the information message is than generated and transmitted to the remote computing device. It should be noted that the information message need not be always generated by the controller or computing device associated with the testing device.

For instance, in the system architecture of US Published Patent Application 2013/0212512A1 if the relevant information needed to generate the information message is known to the server, or even the remote computing device, these computing devices can also generate the information message to be rendered on the remote computing device.

In a further embodiment, information messages can be defined during test program or procedure development. For instance, US Published Patent Application 2010/0077260A1, which is incorporated herein in its entirety by reference, describes a method and system for creating a test procedure using a graphical user interface to arrange and schematically connect test procedure elements to create the test procedure represented by connected graphical icons.

Briefly, a test procedure can be considered to be a flow chart of actions with a beginning, and end, and a sequential flow from start to finish to control a controllable element of a testing device. Testing procedures can incorporate parallel branches that operate simultaneously or based on conditions or looping, but ultimately they progress from the initial action to the final action. The building blocks of the test procedure comprise events, actions conditions and steps. An event can start or initiate a portion of a testing procedure. An action is an activity that is preformed within the testing procedure. Conditions interact with conditional logic so that a rule may establish a condition where the associated action is performed only if that condition is true or otherwise met. There can be single or multiple conditions for a step in the testing procedure. The steps make up the testing procedure, and each step can contain any number of actions and associated conditions. In the test procedure creation of environment, signals or variables can be monitored and compared against defined limits. Alerts can then be enabled such that on occurrence during testing, the user receives an indication that the monitored signal or variable has exceeded the bounds set.

Figure 17:
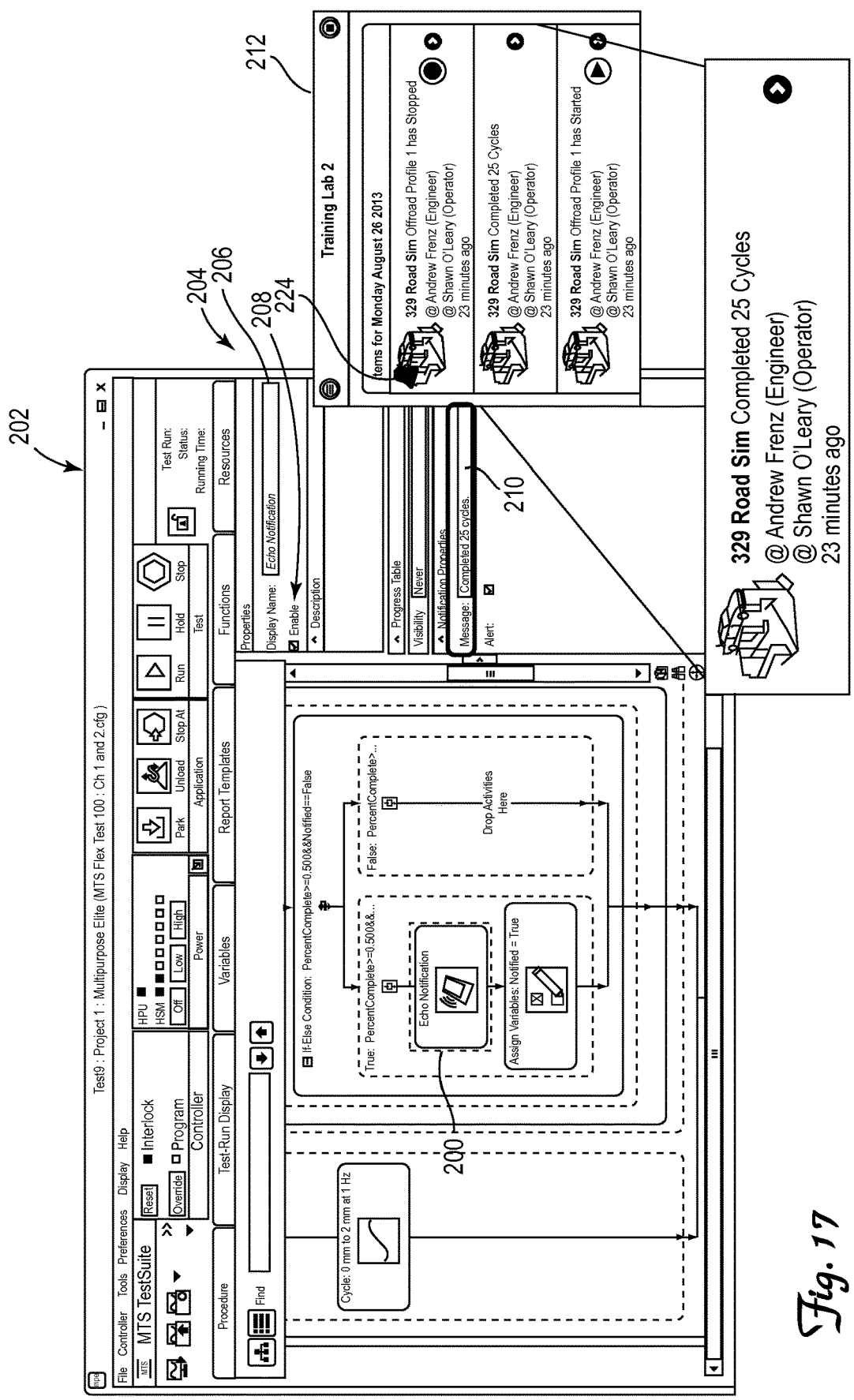

FIG. 17 illustrates a graphical icon 200 that represents generation of an information message to any remote computing device user that is monitoring the testing device during testing. As with the other graphical icons described in US Published Patent Application 2010/0077260A1 graphical icon or box 200 can be inserted anywhere in the test procedure work flow, for example, using an input pointer such as a mouse to drag the box 200 into position in the schematic representation of the testing procedure. The test procedure designer can then indicate the content of the information message to be rendered typically the action portion 16 illustrated in FIG. 1. In the embodiment illustrated, the graphical user interface 202 includes a menu 204 that is accessible upon selection or other indication that the testing procedure designer would like to define the information message to be generated. Menu 204 allows the test procedure designer to enter a name of the information message generator displayed on the graphical user interface 202 at 206. Selectively, the testing procedure designer can enable or disable the information message generator at 208. A description or comment field is provided at 210. The content of the information message can be defined at 212, which can be further based on a variable if desired such as the number of cycles completed during the test. In the embodiment illustrated, the message at 210 is a fixed or static description indicating that the testing device has "Completed 25 cycle." If desired, the information message generator module can incorporate a parameter or variable value during testing (not shown in the illustrative embodiment) so that when the testing device reaches the information generator box during operation of the testing procedure, the value of the parameter or variable can be obtained and included in the information message. As indicated at 212, an alert can also be associated with the information message generator 200. The alert can be enabled or disabled. Referring to the exemplary screen shot for the user interface 10 of the remote computing device at 214 if the information message has an alert enabled it is represented herein by rendering of a graphical icon comprising the bell illustrated in information message 12A of FIG. 1. It should be noted that an information message is not the same as an alert, but rather, an alert herein is communication to an individual interested in the operation of the testing device; however, alerts herein are sent via other communication methods such as by email or text message, by way of example. On the information message 12A, the graphical icon of the bell indicates to the remote computing device user that an alert has been sent.

In an exemplary mode of operation, when the test procedure is being executed and each step is run according to the rules of the test procedure design, whenever the test procedure gets to object 200, the information message is constructed if based on variables, and sent to the remote computing device directly or via the server platform "e.g. internet cloud" to the interested remote users who will then see the information message on their display. If the alert button 212 was checked, the message additionally gets sent via email, txt, or other push notification technology to users based on user alert settings previously defined, such as defined when the test procedure is initialized. This is particularly useful for receiving periodic or important updates about the status of a test. For example, if the test is switching from Stage 1 (warm-up cycle) to Stage 2 (high cycle), then an informational message box can be placed in the graphical representation of the test procedure stating for example "Completed Stage 1 warm-up and moving to Stage 2 (high cycle)."

Testing devices and their components, like any machine, have certain operating parameters within which they are typically operated. Operation outside of one or more of those parameters can be an indication that the device itself may be approaching a failure condition. Health monitoring of, for example, testing devices and their components, can determine in many situations that a failure of the device or component may be more likely, or even imminent. Using an alert, as discussed herein, users may be notified of an impending potential or imminent testing device failure. As with all alerts, individual users may determine and define their own alert settings. Health information in one embodiment is displayed within an equipment profile page. As is known in the art, components may include, by way of example only and not by way of limitation, a power supply for one or more testing devices such as a hydraulic power unit (HPU) or electrical power source. The parameters that can be monitored include pressures, temperature of operation, number of hours since last service, and the like.

Figure 18:
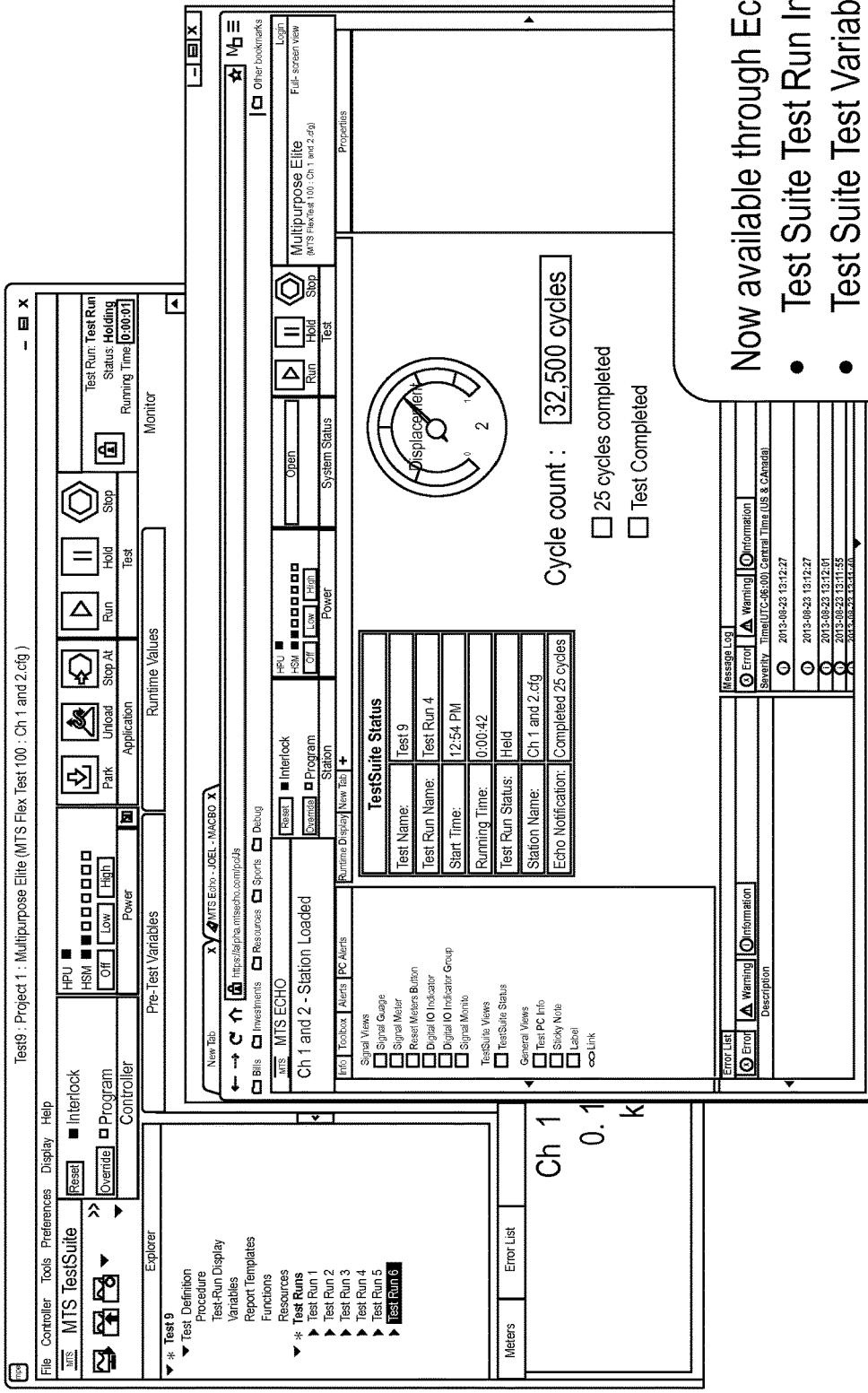

Referring to FIG. 18, additional information concerning the testing procedure being performed on the testing devices is also available for monitoring by the remote computer user in one embodiment. This information can include operational information regarding the testing procedure or testing device or test variables being tested or present in the testing procedure. In addition, the test steps can be displayed remotely, highlighted to show the steps the test is currently on. This allows the remote user to be able to tell exactly where in the test procedure the test is currently at.

Suitable computing environments are described in the aforementioned US published patent applications. Briefly, the description and figures herein can be implemented at least in part, in the general context of computer-executable instructions, such as program modules, being executed by a computer. Generally, program modules include routine programs, objects, components, data structures, etc., which perform particular tasks or implement particular abstract data types. Those skilled in the art can implement the description and figures to computer-executable instructions. Moreover, those skilled in the art will appreciate that embodiments of the invention may be practiced with other computer system configurations, including multi-processor systems, networked personal computers, mini computers, main frame computers, and the like. Embodiments of the invention may also be practiced in distributed computing environments where tasks are performed by remote processing devices that are linked through a communications network. In a distributed computer environment, program modules may be located in both local and remote memory storage devices.

The computer can comprises a conventional personal, mobile, tablet, smart phone, etc. having a central processing unit (CPU), memory and a system bus, which couples various system components, including the memory to the CPU. The system bus may be any of several types of bus structures including a memory bus or a memory controller, a peripheral bus, and a local bus using any of a variety of bus architectures. The memory includes non-transitory read only memory (ROM) and random access memory (RAM). A basic input/output (BIOS) containing the basic routine that helps to transfer information between elements within the computer, such as during start-up, is stored in ROM. Non-transitory computer readable storage devices, such as a hard disk, an optical disk drive, ROM, RAM, flash memory cards, digital video disks etc., are coupled to the system bus and are used for storage of programs and data. Commonly, programs are loaded into memory from at least one of the storage devices with or without accompanying data.

An input device such as a keyboard, pointing device (mouse), touch sensitive screen or the like, allows the user to provide commands to the computer. A monitor or display or other type of output device is further connected to the system bus via a suitable interface and provides feedback to the user. Communications are provided based on program modules executed by the computer and through a suitable interface coupling the computer to networks and other computing devices.

Figure 20:
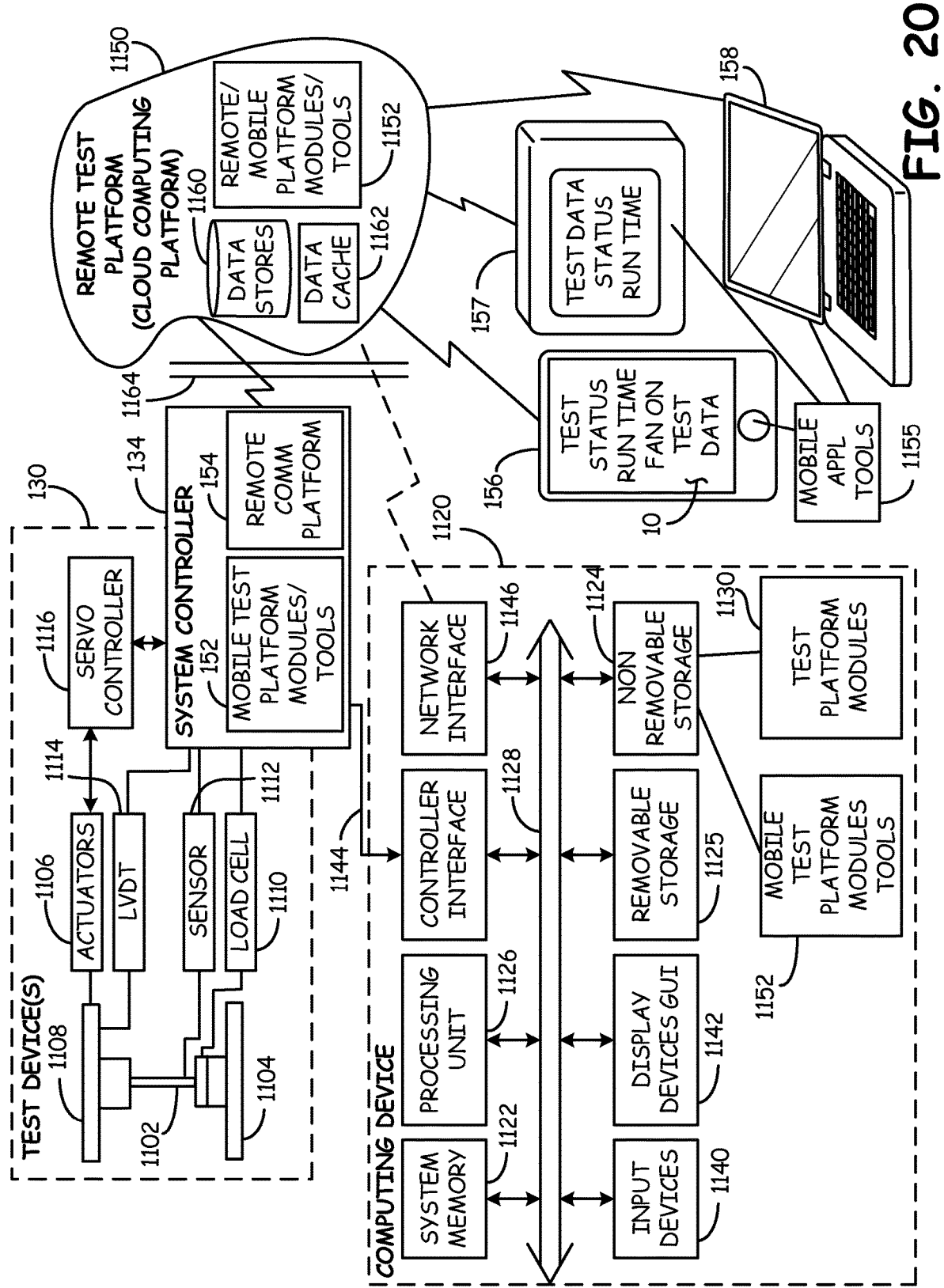
FIG. 20 illustrates an embodiment of a remote test platform for providing access to test data and status for a test device.

A platform on which embodiments of the present disclosure may be practiced is shown in FIGS. 20-33. Test machines are used to test performance of consumer products, electronics materials, medical and other devices. FIG. 20 illustrates a test device or device 130 used to measure parameters or performance of a material specimen 1102 secured to a frame 1104 of the test device 130. The test device 130 shown includes an actuator 1106, which is energized to apply loads to the specimen 1102. In the embodiment shown, the load is applied to the test specimen through a movable cross-head 1108 coupled to the frame 1104 of the test device. The input force is measured by a load cell 1110 positioned in the load path of the actuator 1106. The test device 130 includes various sensors and transducer devices 1112 to measure response to the load input. In the illustrated embodiment, a sensor 1112 such as a strain gauge is coupled to the specimen to measure strain. The test device shown also includes a Linear Voltage transducer 1114 to measure input displacement.

As shown, operation of the actuator 1106 is controlled via a servo controller 1116 via input from a system controller 134. The servo controller 1116 and system controller 134 shown include various hardware and software components to implement control functions of the test device 130. Feedback from the sensor or load cell 1110, 1112 is provided to the system controller 134. As shown, the system controller 134 is coupled to a computer system 1120 or controller 134, such a PC computing device including one or more hardware components. Connection of the test device 130 to the computer system 1120 or controller 134 provides a program interface to define and set the control parameters for the test device 130. As shown, the computing device or PC 1120 or controller 134 includes non-volatile system memory 1122 and various non-removable data storage devices 1124 and removable data storage media 1125 operable coupled to a processing unit 1126 through a bus structure 1128. Illustrative storage media includes solid state memory devices, hard disc drives and other hardware devices Operating system and other application modules are stored in system memory 1122. Various program modules are stored on non-volatile/non removable storage media 1124. For example, the various programs stored on media 1124 include a test platform 1130 as well as mobile test platform modules or tools configured to implement various functions of the mobile test platform as described. Additional data and programs are stored on the various removable and/or non-removable storage devices. A user interfaces with the computing device 1120 or controller 134 through input devices 1140 and a display device 1142 (schematically shown) to control operations of the test device 130. Illustrative input devices include one or more of a keyboard, touch screen, pointing device, microphone or mouse and illustrated display devices 1142 include a monitor having a graphical user interface displayable on a display screen, such as a LCD screen. The computing device 1120 or controller 134 interfaces with the system controller 134 of the test device through a controller interface 1144. Illustratively, the controller interface 1144 can be implemented through a USB port. The computer 1120 or controller 134 is also connected to a wide area network or world wide web (Internet) through a network interface or modem 146 to access information through the Internet.

The test platform modules 1130 include application programs that allow the user to input test parameters and specification through the graphic user interface on the display device 1142. The test parameters define time, duration and force profile to be applied to the test specimen 1102. Different load or test profiles can be applied depending upon different test criteria. For example, the test criteria can specify a static load for a specified duration followed by intermittent cyclical load. Based on the input test parameters the test platform modules 1130 generates control parameters which are provided to the system controller 134 to provide control commands to the actuator 1106 or other test system components. Output from the sensors 1112, LVDT 1114 or load cell 1110 provides feedback to the system controller 134 or servo controller 1116 to provide closed loop feedback control of the actuator 1106 or test device. Output from the sensors 1112, load cell 1110 and other devices is also transferred to the computing device 1120 or controller 134 and stored to one or more of the data storage media to store of test data for analysis and review.

In the embodiment shown, the test device 130 communicates with a remote test platform 1150 implemented through a remote server or cloud computing platform to provide remote access to test data and operating status of the test device 130. The remote test platform 1150 shown is implemented on computing device(s) similar to computing device 1120 or controller 134 and includes remote platform modules or tool 1152 operable on the computing device(s) to provide access to device data and operation status of test device 130 to one or more remote computing devices described below.

As shown, remote platform functions are implemented through mobile test platform modules and operating tools 1152 on the computing devices 1120 or controller 134 and/or system controller 134. The mobile test platform modules or tools 1152 are configured to interface with control units or I/O signals from various device components including the actuator 1106, LVDT 1114, sensor 1112 and load cell 1110 shown in FIG. 20 to retrieve data which is transmitted to the remote platform 1150 through a remote communication platform 1154 to provide mobile or remote access to test device 130 and various types of data of the test device 130. As shown, test data, including data from the sensor, load cell, actuator and sensors is provided from the system controller 134 to the remote test platform 1150 for access by remote or mobile computing devices, such as but not limited to mobile or cellular phones 156, tablets 157, laptop or portable computers 158 and remote desktop computers (not shown in FIG. 20), each of which can have functional elements similar to that of computing device 1120 or controller 134. In the illustrated embodiment, the remote test platform 1150 is external to a fire wall 1164.

Data is transferred via the remote communication platform 1154 to the remote test platform 1150 through a communication interface or port of the controller (not shown) or computer device over a communication link. Illustratively the communication link is a cable or wireless communication link or combination of a cable and wireless communication link. Large amounts of test data and/or status events can be transmitted using a real time streaming protocol or long polling algorithms such as Comet algorithms or Websocket Protocol, for example to respond to data requests from mobile or remote computing devices to provide test data to the remote or mobile devices. As shown, data from test device 130 such as test data is stored to a data cache 1160 or data store 1162 of the remote test platform 1150 at least temporarily or otherwise in a manner where it can be transmitted to one or more of the mobile or remote devices as shown in FIG. 20. In other words, data from test device 130 such as test data and/or status events (e.g. whether the test device 130 is performing the test or has stopped) can be transmitted through the remote test platform 1150 to one or more of the mobile or remote devices 156 and rendered to the user thereof in real time. As used herein, "real time" means the data is rendered without intentional delay, given the processing limitations of the components of the overall system and the time required to accurately measure or otherwise ascertain the data. In the embodiment shown, remote communication platform 1154 is part of the controller 134 but as will appreciated by those skilled in the art could be implemented as a separate unit or through the computing device 1120 or controller 134. Moreover, it should be understood that the depiction, arrangement and/or description of all of the various modules, interfaces, components and the like herein are done so for the purposes of understanding the purpose or role of such elements and should not be considered limiting, but rather that such modules, interfaces, components and the like can be combined together or separated as desired. Illustratively the mobile test platform modules 1152 implement various functions such as setting alerts, implementing maintenance functions, status updates and remote access to test data. As previously described, test data can be transmitted as a data stream to remote computing devices and decoded by a real time player or decoder. The decoded data is displayed on a GUI display 182 of the remote computing device. In one embodiment, the mobile test platform modules 1152 include a summary algorithm to generate summary data from the i/o data or otherwise pertaining to the test device 130 for transmission to the remote test platform 1150 and subsequently to a mobile or remote device. For example, mobile test platform modules 1152 can include a computer based procedure to gather certain data stored in the system controller 134 and/or computing device 1120 or controller 134 relevant to a problem occurring on the test device 130, summarizing such data and/or packaging such data, which is then provided to remote technical support personnel for diagnosing and/or servicing the problem.

In yet another embodiment, mobile test platform modules 1152 can include a computer based procedure herein illustrated as a usage tool 366 (FIG. 33) to gather information related to usage of the test device 130 such as but not limited to amount of time the test device 130 was operating and/or performing a test, the number of cycles of the actuator(s) 1106 overall, and/or related to the level of performance or usage that the test device was run at, for example, as measured with reference to the maximum capabilities of the test device 130 such as amount of time the device was operated above a certain level (e.g. based on full load capabilities of the actuator(s) such as overall time operated with the actuator(s) applying 25% or less of full load, overall time operated with the actuator(s) applying between 26% to 50% of full load, overall time operated with the actuator(s) applying 50% or more of full load; based on cyclical rate of the actuator(s) such as overall time operated with the actuator(s) cycling at less than 10% of maximum rate, overall time operated with the actuator(s) cycling at a rate between 11%-75% of maximum rate, overall time operated with the actuator(s) cycling at 76% or more of the maximum rate; and/or based on a level of hydraulic power needed to operate the test device 130 such as overall time operated requiring 10% or less of full load capabilities of the hydraulic power supply unit (not shown) powering the test device 130, overall time operated requiring between 11%-25% of full load capabilities of the hydraulic power supply unit, or overall time operated requiring more than 26% of full load capabilities of the hydraulic power supply unit, where the cited examples or not intended to be a complete list of each possible parameter, but rather merely examples).

At this point it should be noted that the foregoing examples of usage of the test device 130 can also serve as a basis for ascertaining the price to be paid by the user, at least in part. For example, any or all of the cited examples of usage or other parameters or measures indicative of usage can have an associated cost such as each percentage or range of percentages of usage has an associated cost, where higher demands placed on the test device 130 have a corresponding higher cost. Then, the total cost to the user for using the test device 130 or other associated equipment such as the hydraulic power supply unit, for example, for any desired time period can be calculated by adding together the costs for each individual time of usage, an invoice or the like can then be generated and reported to the owner of the equipment.

In yet a further embodiment, any or all of the foregoing measures or other measures of usage can be used by maintenance tool 360 to ascertain when service or maintenance is required for the test device 130. For example, any or all of the cited examples of usage or other parameters or measures indicative of usage can have an associated wear or damage unit such as each percentage or range of percentages of usage has an associated wear or damage unit, where higher demands placed on the test device 130 have a corresponding higher wear or damage unit. Then, maintenance can be based on when a certain amount of wear or damage units have been obtained, or other thresholds with respect to the measures of usage have been exceeded. The ability of the mobile test platform modules 1152 on each test machine 130 in communication with the remote test platform 1150 for delivery to a remote computer user communicating with the remote test platform 1150 based on a schedule or based on request is particularly useful, advantageous and/or efficient. If desired, data indicative of usage and/or data indicative of wear or damage units together with information already known about the test station, test device or related equipment such as but not limited to age, model, and accessories, can be used by a tech support tool 362 and/or product/accessory support tool 364 (FIG. 33) to generate an estimate of the costs for an upgrade, or an estimate of the value of said equipment, which can be provided directly or indirectly via platform 1150 to the test device user and/or one or more remote or mobile computing devices.

A user can interface with the remote computing devices through various input devices such as touch screen input devices or keyboards to remotely access test data and status information. Thus, as described, the mobile test platform provides the user with remote/real time access to the status of testing operations while away from or remote from the test device. In one application, the devices link to the data in the remote test platform 1150 through an Internet URL address. The URL address includes address location of the remote test platform 1150 and address information identifying the user and the specific test device. Thus, the remote test platform 1150 processes the URL address to locate and transmit the specific test data or test information for the user's test device.

The mobile or remote computing devices use one or more mobile application tools 1155 to access the remote test platform 1150. Illustratively, the mobile application tools 1155 include instruction and code to input URL or user or device identification to interface with the user's test station or devices 130. The mobile application tools 1155 also include instructions to process test data from the data stream and generate the graphical user interface display on the mobile phone 156, tablet computing device 157, portable computing device 158 or other remote computing devices not shown in FIG. 20. The mobile application tools 1155 can be downloaded from the remote test platform 1150 and installed in the remote computing device. The test platform defines different data types, objects and GUI displays for different devices. The mobile phone, tablet or other computing devices use objects and code to display the test data and interface with the test platform to retrieve and request data.

In particular, the tools include a logon function to receive an access input such as a username and password or other access input such as an embedded code on a chip or bar or QR code. It should be noted that application of the embodiment illustrated in FIG. 20 is not limited to a test machine of the type illustrated in FIG. 20. For example in an alternate embodiment, data from a controller for an orthopedic test system can be transmitted to the remote test platform for remote access.

Figure 21:
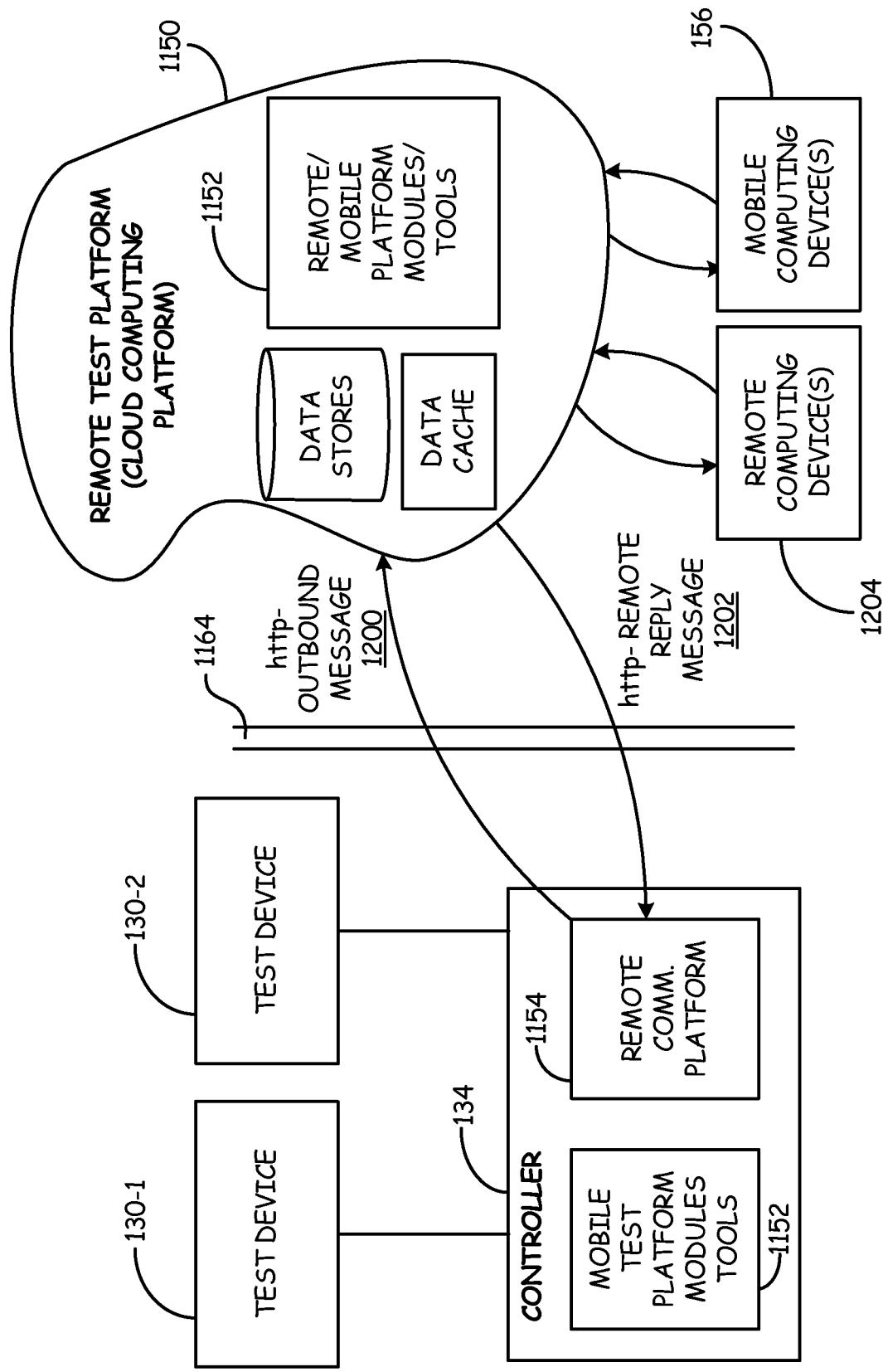
FIGS. 21-22 illustrate an embodiment of a communication sequence for interfacing with a remote test platform illustrated in FIG. 1.

FIGS. 2-3 illustrate a communication sequence for interface between one or more test devices 130-1, 130-2 at a test facility separated from the remote test platform 1150 by firewall 1164 or electronic screening application. As shown in FIG. 21, the mobile communication platform 1152 is programmed or configured to generate an outbound message to the remote test platform 1150. The outbound message 1200 may be generated based upon a system status change, such a test completion status, alert status or maintenance status. In response to the outbound message 1200, the remote test platform 1150 generates a message reply 1202 to request test or other data. In response to the message reply, the remote communication platform 1154 transmits the requested data such as status alerts, test data, maintenance data or other data. As shown in FIG. 21, in response to the outbound message 1200, the remote test platform 1150 determines if any remote or mobile computing devices are requesting data and or an alert is pending and if so (or requests first initiated by the mobile or remote device 156) generates the reply message 1202 for the requested data. As indicated above such messaging can be performed using long polling or Websocket protocols. Data can be requested by the mobile or remote computing device to the remote test platform 1150 through activation of a status alert or data request function inputted by a user through input devices of the computing device 1120 or controller 134 or various remote computing devices 1204.

Figure 22:
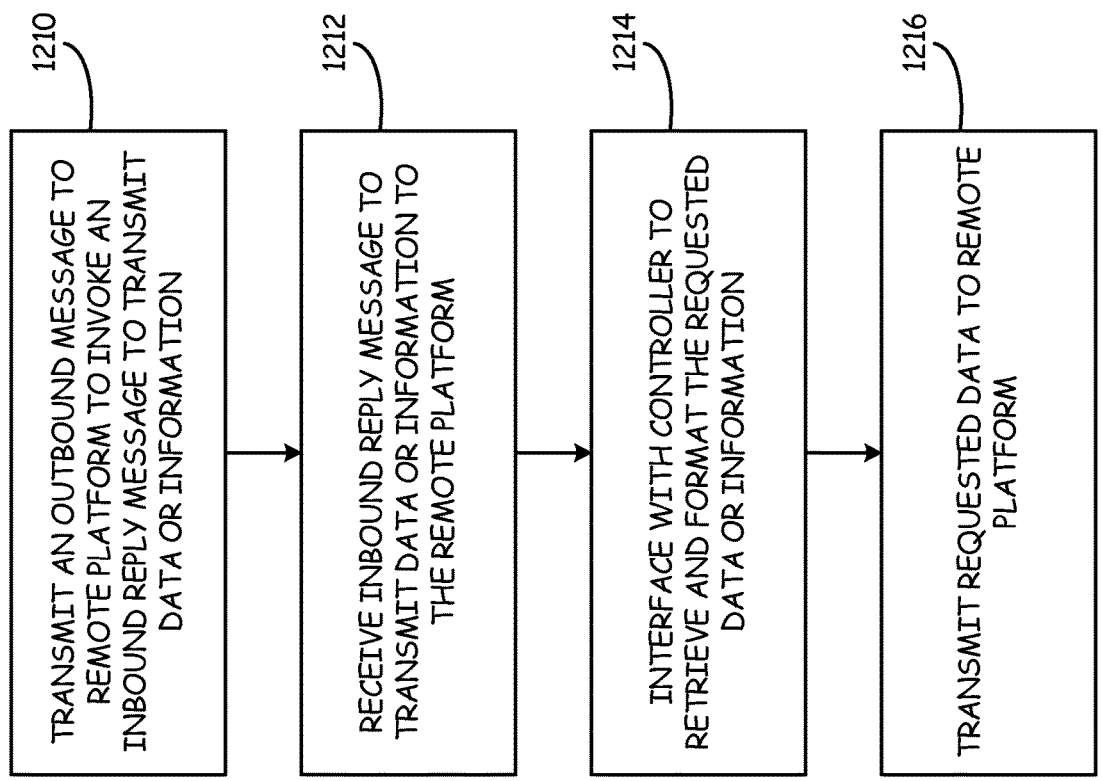

FIG. 22 illustrates the communication sequence between the controller 134 or test device 130 and the remote test platform 1150 as previously illustrated in FIG. 21. As shown in step 1210, the communication platform 1154 generates the outbound message 1200 to the remote test platform 1150 to invoke an inbound reply message 1202 (albeit possibly delayed in time) for data from the remote test platform 1150. The inbound or outbound messages can include a requested data type for transmission. In step 1212, the communication platform 1154 receives the inbound reply message 1202. In response to the inbound reply message 1202, the remote communication platform 1154 interfaces with controller 134 to retrieve and format test data or information from the controller 134 using if needed mobile test platform modules 1152 as exemplified above in step 1214. In step 1216, the communication platform 1150 transmits the data to the remote test platform 1150. The outbound message 1200 can be generated based upon a change in test status or in response to an alert implemented via mobile platform modules 1152 in response to user input, or otherwise sent repeatedly waiting for a remote or mobile computer user to inquire upon its status or current location in a test performed on a test specimen. In response to the outbound message 1202, the remote test platform 1150 can poll or otherwise wait for a request from the remote or mobile computing devices to determine if a data request or alert is pending and generates the reply message 1202 to request data to respond to the data request or alert for particular test device(s) at a particular test facility. Illustrative data includes run state, interlock state, signal values and station logs, hydraulic power unit on/off status, and low/high status, test status, test running time, cycles completed, force data, displacement data, maintenance alerts, failure data, commanded force and/or displacement data, a test run/hold/stop status or other data. The requests made upon the test device 130 can come from and be provided to one or more mobile devices 156, where requests made upon the test device 130 can be different for each mobile device user. The remote test platform 1150 can maintain user account information for each user that accesses the remote test platform indicating which test device 130 or collection of test devices 130 the user has authority to access as well as information pertaining to what authorized requests can be made upon each or a collection of test devices 130.

In one embodiment, the remote test platform 1150 maintains a queue for each test device 130 connected thereto containing all requests made to the test device 130 from one or more users of the mobile or remote devices 156. The requests can be embodied in the remote reply messages 1202 in first-in-first-out basis, or based on some priority if desired. It should be noted that the requests made to the test device 130 and the responses therefrom need not be limited to inquiring as to the status, obtaining real time test data, or summary of information as described above, but could also take the form of communications between the mobile device user(s) having access to the test device and/or the operator of the test device 130. Such communications can be text messages, image messages, audio and/or video clips rendered to each of the users using the GUI and necessary hardware (e.g. monitor and/or speakers) depending upon the hardware and processing capabilities of the mobile computing device 156, the remote test platform 1150 and the remote communications platform 1154. Communication provided through the remote test platform 1150 when the user of the test deice 130 and/or the users having access to the test device 130 is particularly efficient since one or both users (which can also include communications just between users of mobile devices 156) attention is focused on performance or use of the test device 130. Likewise, in situations when such users may not be at the test device 130 or a remote user is not connected to receive data from the test device 130, messages can be stored, for example, at the remote test platform 1150 and provided to the user at the test device 130 or when connection is made with a remote or mobile device 156. Again, this is particularly efficient since notification and/or delivery of the stored communication is provided when the user's attention is now focused on the test device 130. The GUI can initiate capture or recording of each of the various types of communications with selection of a corresponding button or the like by the user on the GUI.

Figure 23:
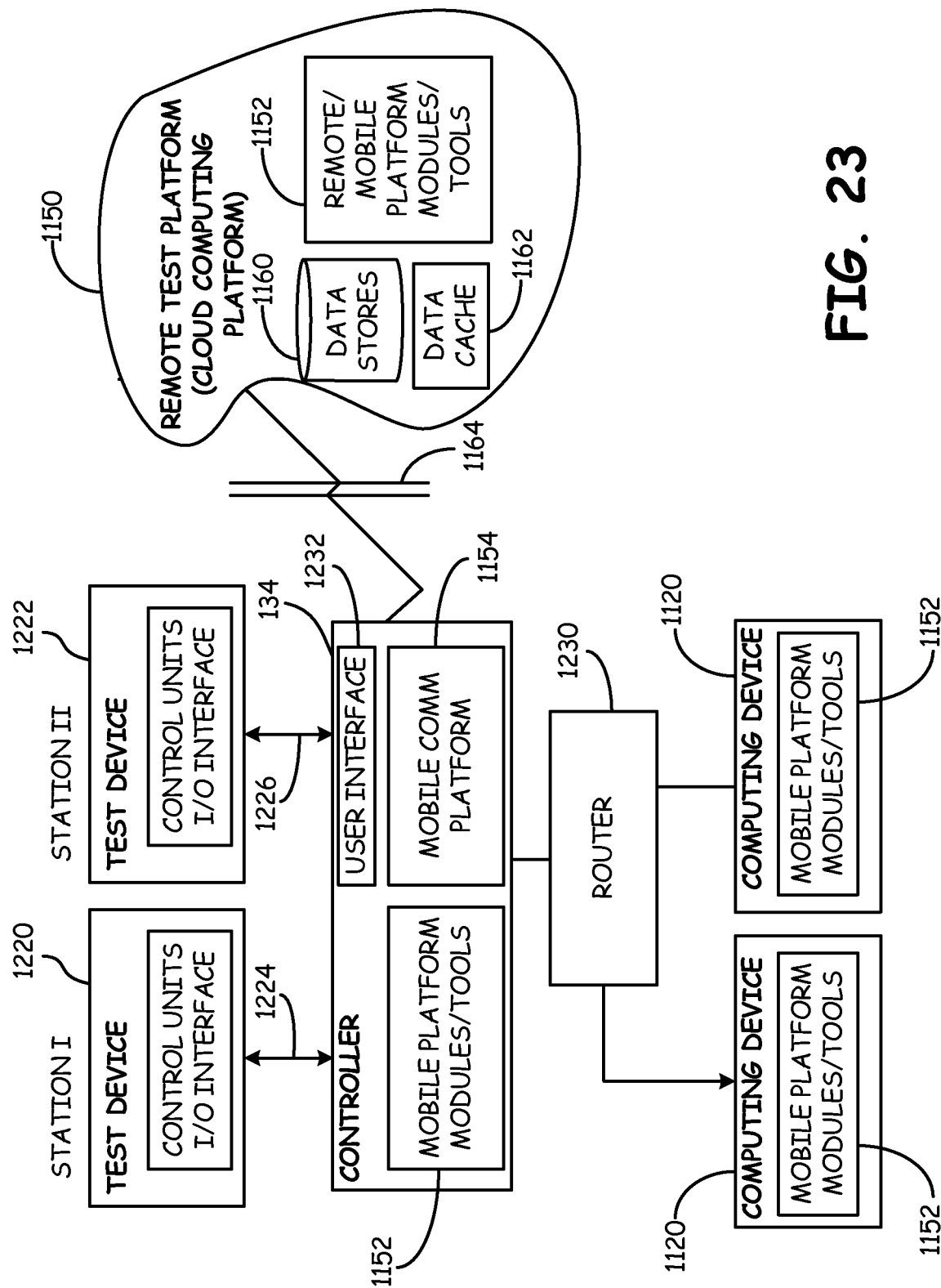
FIG. 23 illustrates an embodiment of a remote test platform for providing access to test data and status for a plurality of test devices in a laboratory facility.

FIG. 23 illustrates a test application for a test facility having a plurality of test devices at a plurality of test stations 1220. In the illustrated embodiment the controller 134 communicates with the test devices of a plurality of test stations 1220, 1222 through one or more communication channels 1224, 1226 connected to each test station (only one shown in FIG. 23). The controller 134 transmits input commands and output over the one or more communication channels to interface with one or more control units of the testing device such as sensor, actuator, load cell and LVDT (not shown in FIG. 23). Illustrative input/output includes commanded force or displacement and feedback force or displacement. The controller receives i/o data from the control units and provides the data to the mobile communication platform 1154 through the communication channels 1224, 1226 for transmission to the remote test platform 1150. As shown, PC computers 1120 or controller 134 for operating each of the test stations 1220, 1222 can be connected to the controller 134 through a router 1230 or connected directly to the controller through, for example, a USB port connection or direct Ethernet connection. In the illustrated embodiment, the controller 134 includes a user interface 1232 to activate various functions of the mobile test platform.

Figure 24:
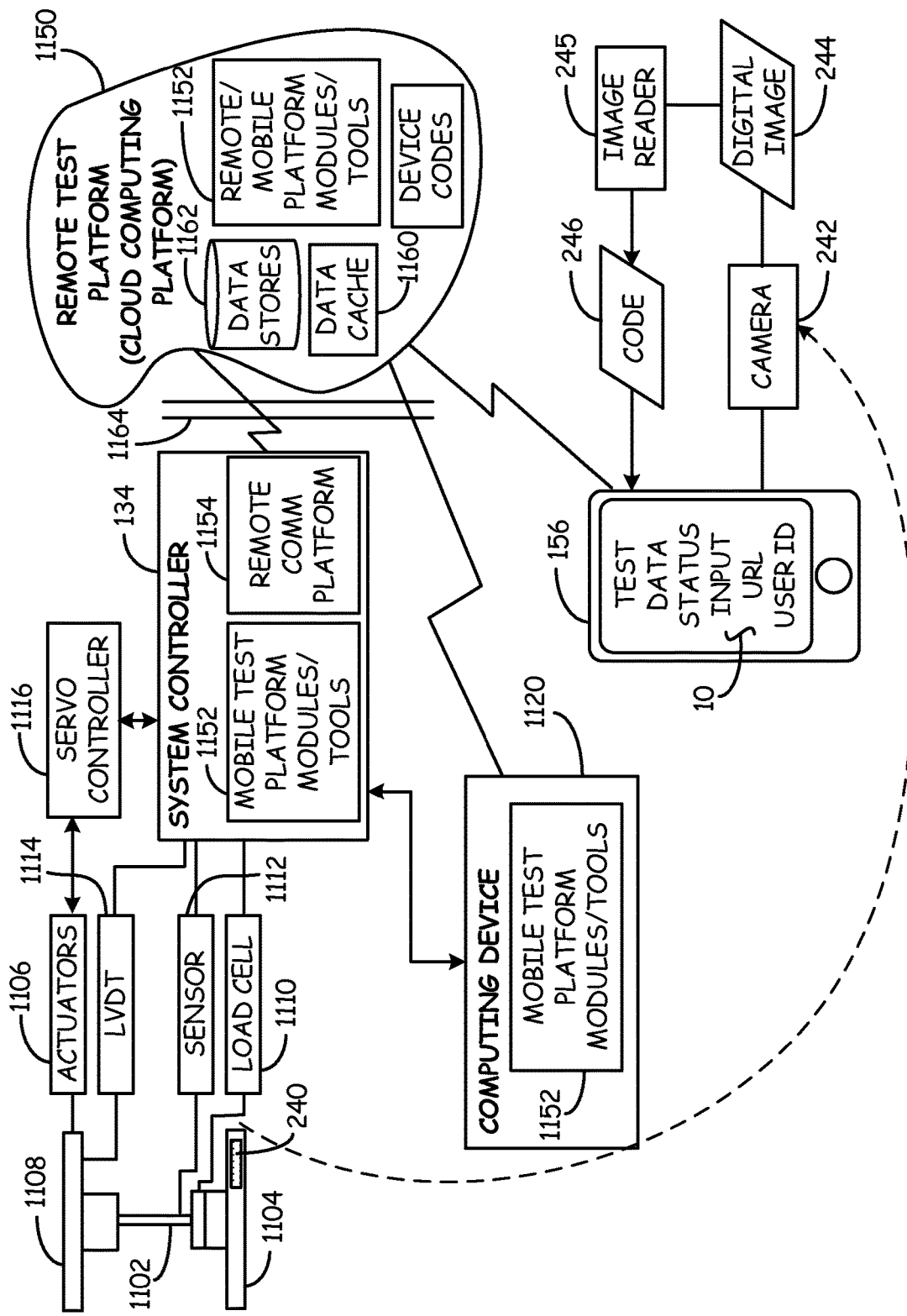
FIGS. 24-25 illustrate embodiments of a remote test platform utilizing image or bar codes to identify testing devices or components to access status information and data therefor.

FIG. 24 illustrates another embodiment of a test device implementing a mobile communication platform as previously described. In the embodiment the testing apparatus or device has an ID code 1200 (identification) to distinguish multiple test devices and the data therefor. The ID code is associated with an image such as a bar or QR code 1202, which is affixed to the test device 130. The pattern of the image or bar code is stored in memory of the system controller 134 or computing device 1120 or controller 134 shown and the remote test platform 1150. Test data from the device is stored in the cache or data store 1160, 1162 of the remote test platform utilizing the ID code 1200. As shown, the mobile device (or other remote computing device—not shown) equipped with a camera 240 is used to access data utilizing image or bar code 1202 affixed to the test device 130. The camera 242 captures an optical image 244 of the bar code 240 and provides a digital image of the bar code to a reader application 245. The digital image is processed by the reader application 245 to provide an alphanumeric URL code 240 or the like which is used to access information or data for the test device 130 from the remote test platform 1150. In alternate embodiments, near field communication tools are used to provide the code. In such embodiments the mobile or remote computing device uses a radio to retrieve an embedded code on a chip (NFC chip or tag) when the radio is held closely to the chip. The code is then used an the access input to access information or data for the test device through the remote or mobile computing device.

Figure 25:
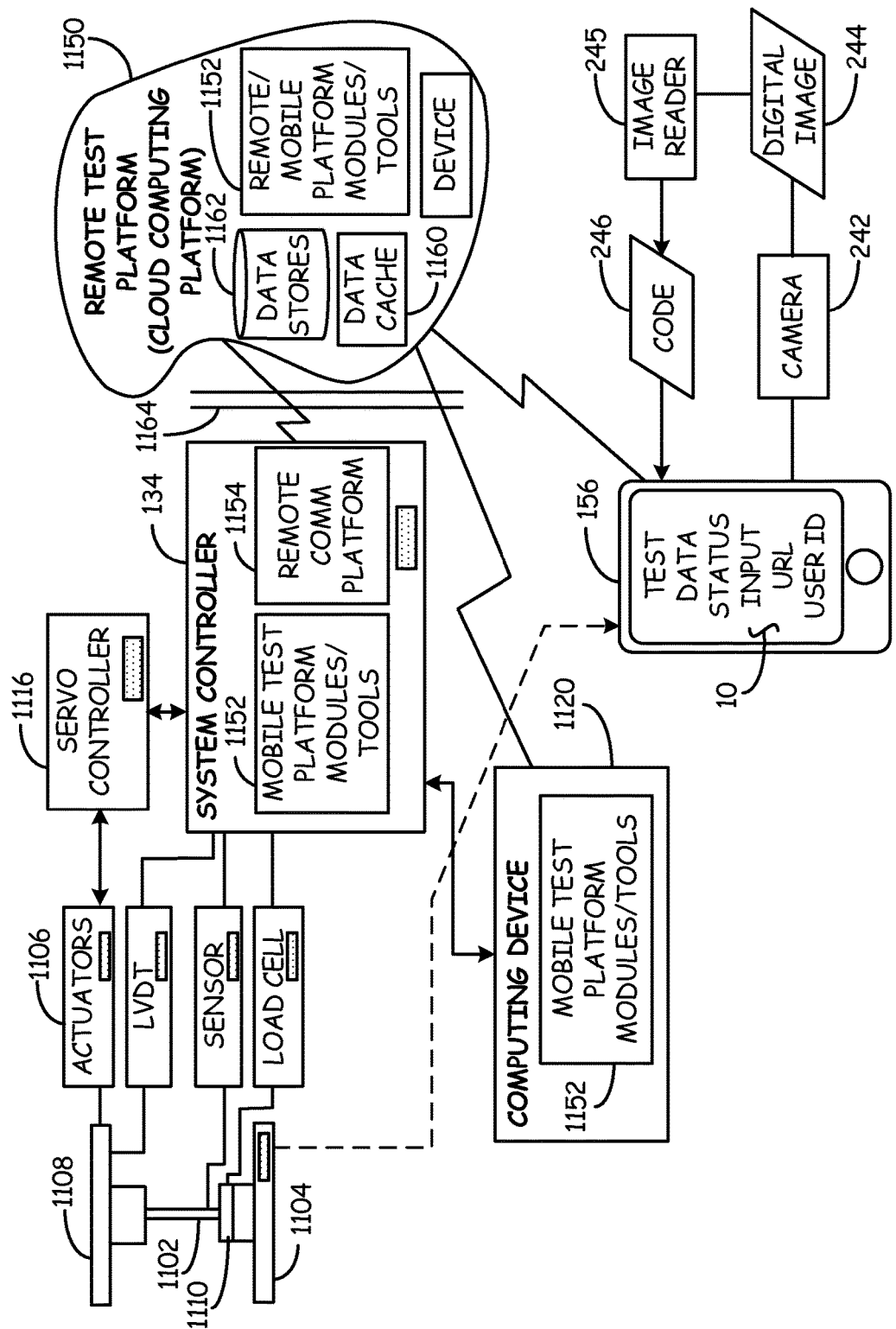

In the embodiment illustrated in FIG. 25, each of the components of the test device 130, including sensor, actuator, LVDT, and load cell and controller components include identification codes. In the embodiment shown, components of the test machine are identified by separate identification or image codes. In particular as shown, the actuator, load cell, LVDT, frame and various sensors include codes to access specific data for each of the components separately. The specific data can be used to perform maintenance checks as previously described or retrieve technical data. The image or bar codes on the actuator 1106, load cell 1110, LVDT 1114 and sensor 1112 provides a component ID or URL separate from the device 130. Data transmitted includes an associated device ID or component ID to distinguish the source of the data. A user can access test or maintenance data for the device or any component of the device 130 using the image or bar codes as previously described with respect to FIG. 24.

Figure 26:
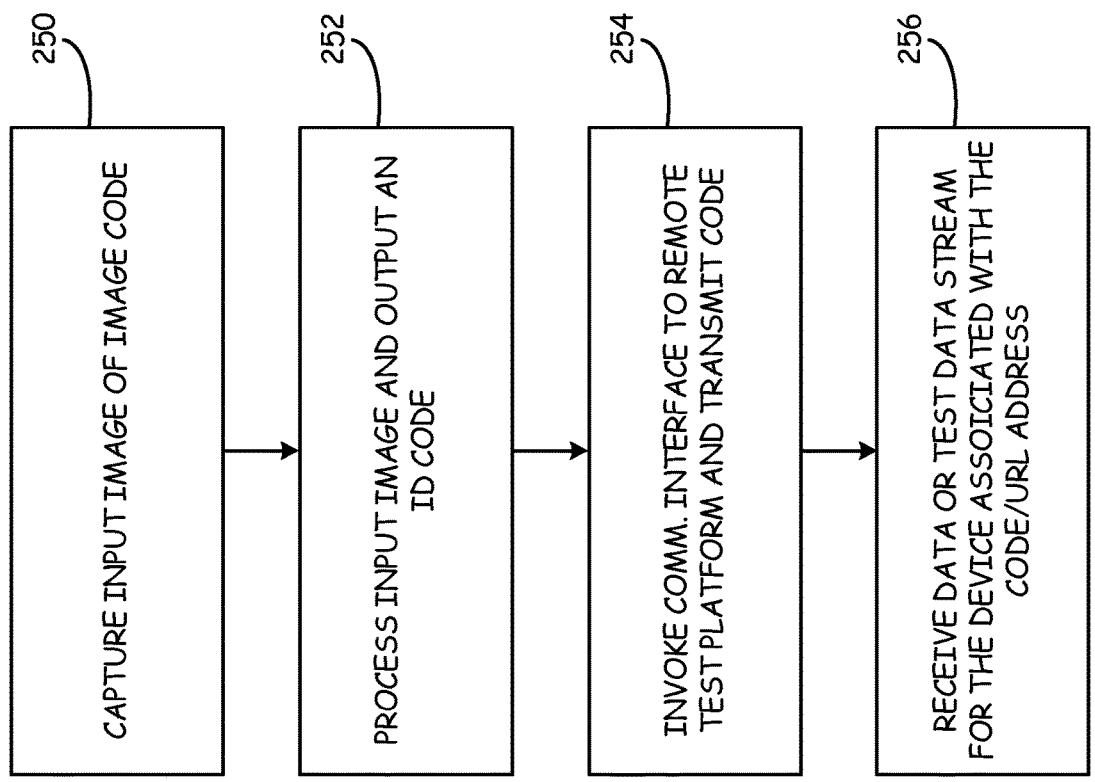
FIG. 26 illustrates steps for utilizing an image or bar code as illustrated in FIGS. 5-6.

FIG. 26 illustrates method steps for accessing the test data on the remote test platform 1150 through a mobile or remote device using the camera 242 on the mobile device and image or Q/R code (e.g. matrix bar code) affixed to the device 130. As illustrated in step 250, an input image of the bar code is captured via the camera 242 to generate a digital image 244 of the bar code. The digital image is processed by a bar code reader 245 as illustrated by step 252 to provide the device ID or code. In step 254 an interface to the remote test platform is invoked to transmit the code and mobile device address. As illustrated by step 256, the mobile or remote device receives data feeds or alerts for the test device corresponding to the device code or URL address.

Figure 27:
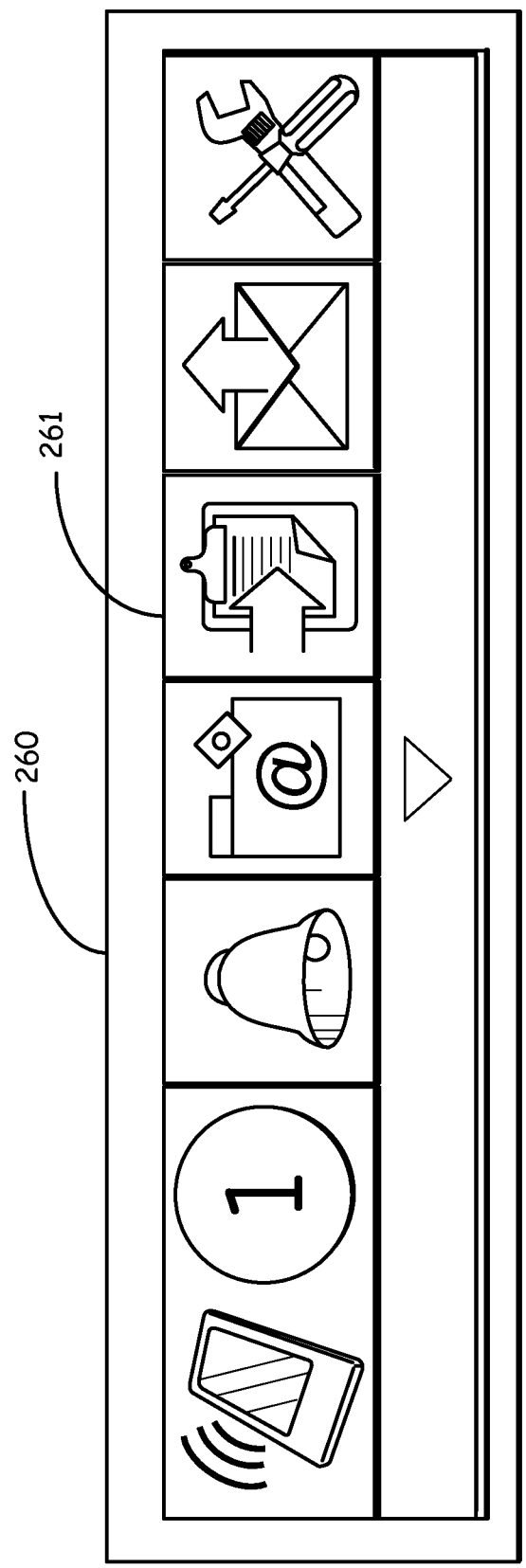
FIG. 27 illustrates a display bar for implementing functions of the mobile test platform.

FIG. 27 illustrates an embodiment of a GUI display bar 260 which can be displayed through the display device 1142 of the computing device 1120 or controller 134 or through a display device of the system controller (not shown). The GUI display bar 260 is implemented through the test platform modules or tools 1152 on the computing device 1120 or controller 134 or system controller 134. As shown the GUI display bar 260 allows the user to enable/disable alerts, send the URL for the test lab or facility to remote computing devices using e-mail or text messaging and change or set equipment states for the test device(s). In particular selection of message icon 261 allows the user to e-mail or text message a link through the PC computing device 1120 or controller 134 in the lab to the user's remote computing device. Selection of the link retrieves data and information for the test devices to provide a GUI display as shown in FIGS. 28-30 on the user's remote computing device.

Figure 28:
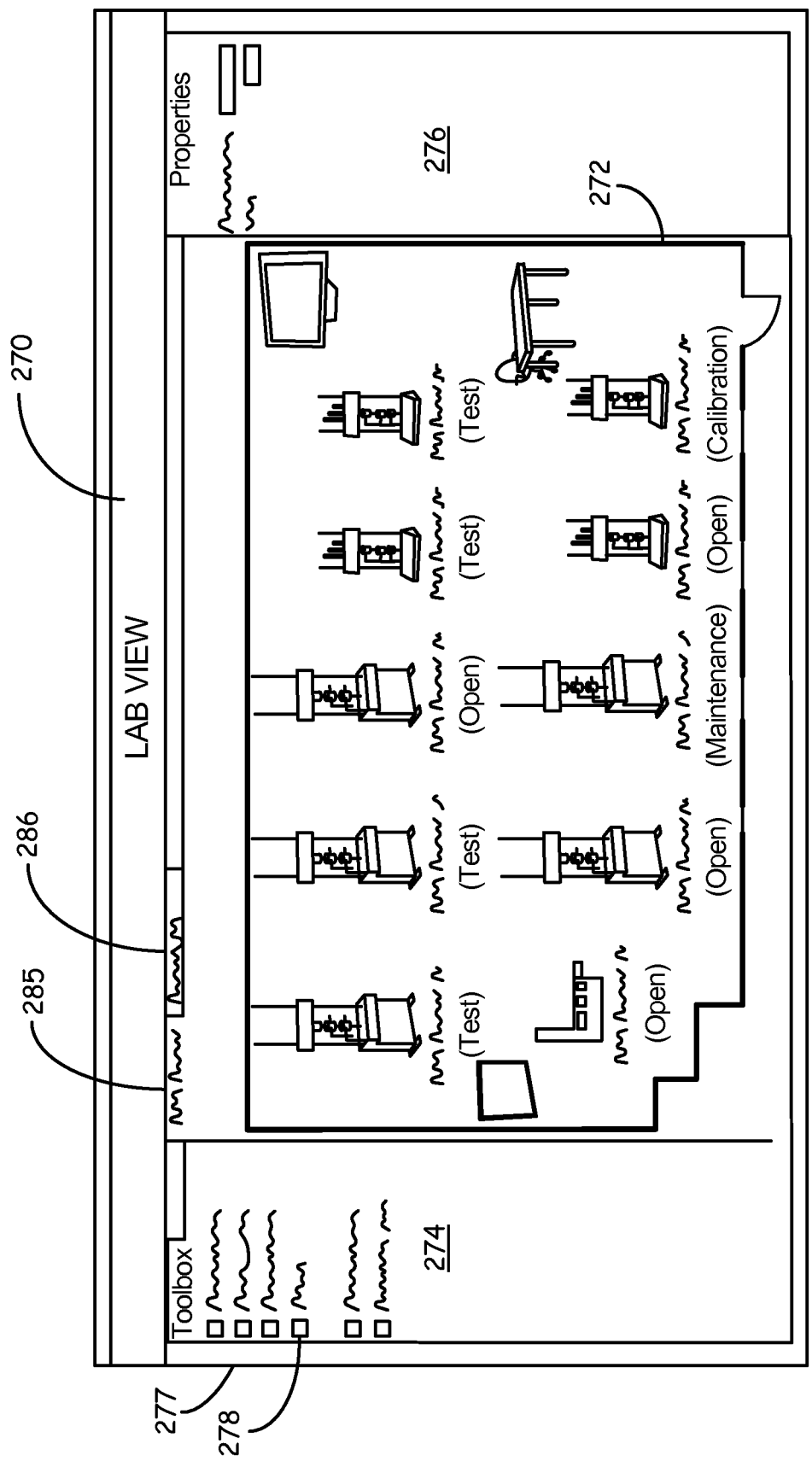
FIGS. 28-30 illustrate GUI displays for a computing device configured to interface with the remote test platform to access test data and status.
Figure 29:
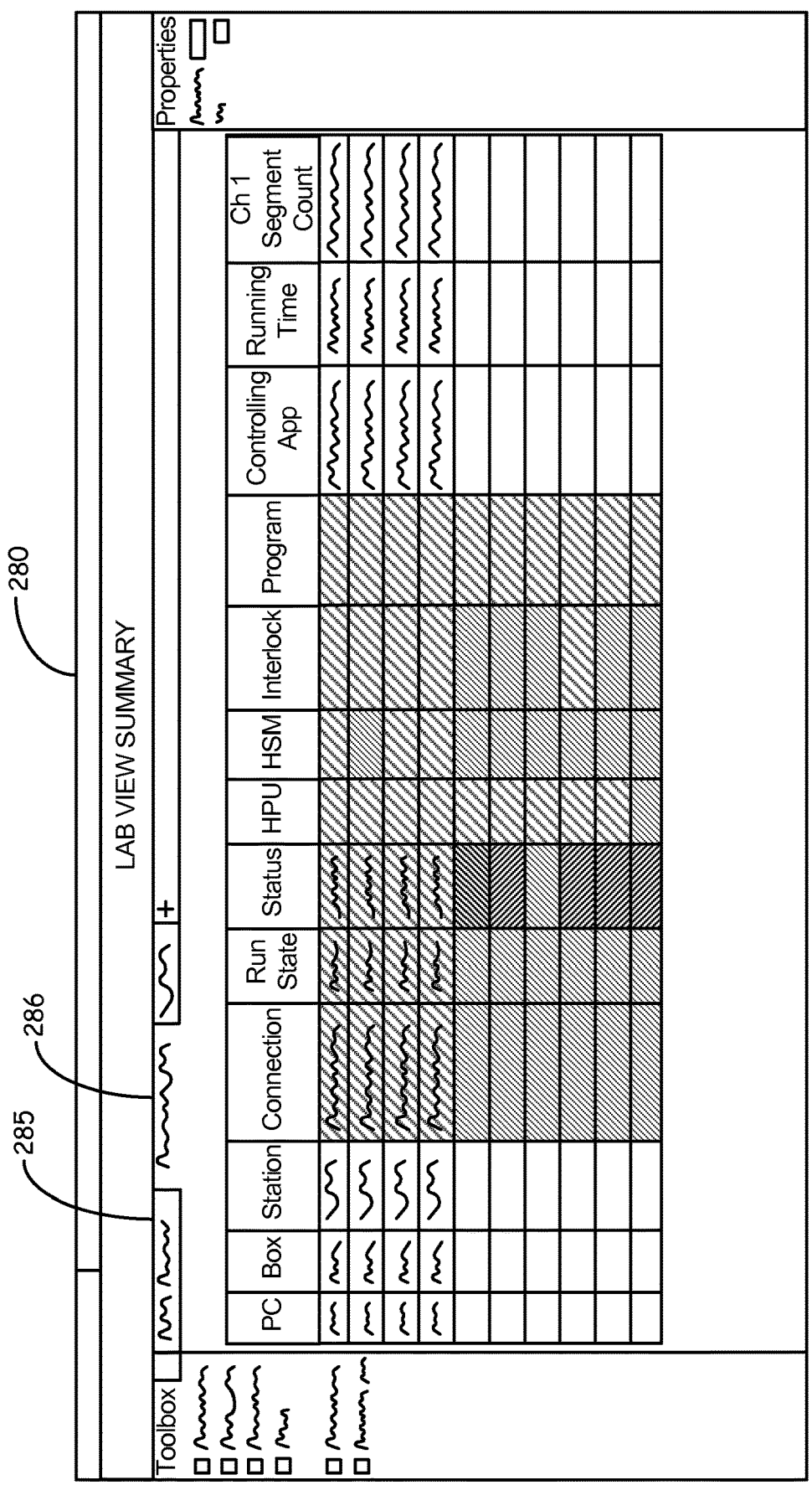
Figure 30:
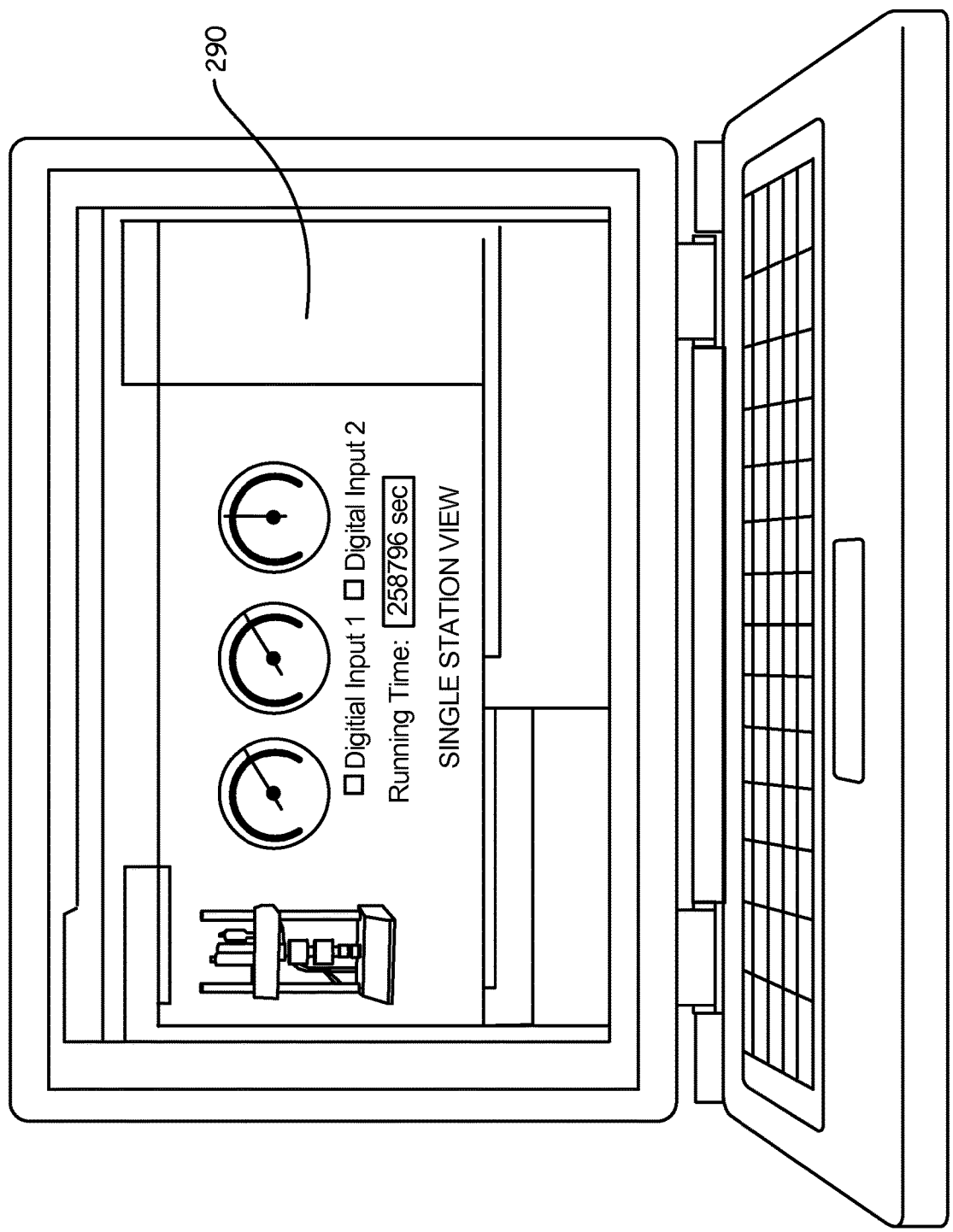
Figure 31:
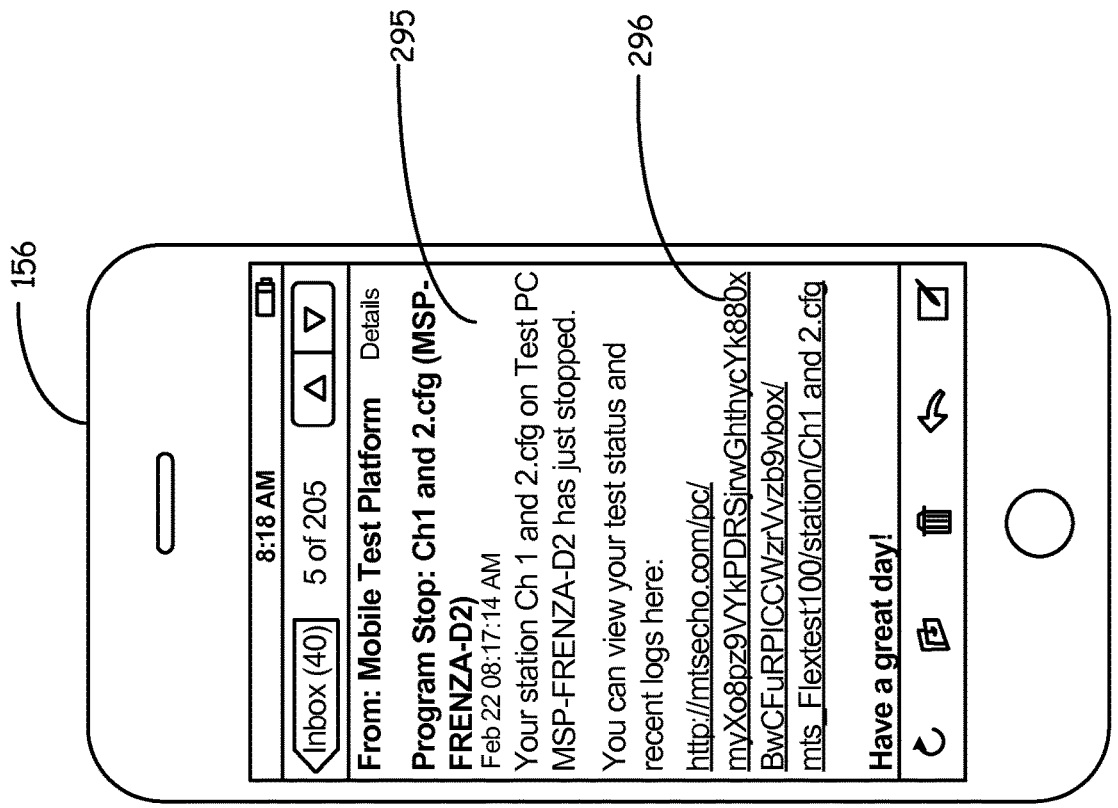
FIG. 31 illustrates an alert notification generated by an alert function of the mobile test platform.

FIGS. 28-30 illustrate various GUI displays for remote computing devices 1204 to provide access to test data and status. As previously described, the remote test platform or system can be utilized to provide data to remote computing devices such as desk top computer, portable computers or tablets. To provide remote access, the computer or tablet includes the mobile application tools 1155 and modules to access test data, status information and activate alerts. The tools or modules on the computer or tablet are configured to generate various GUI to interface with the mobile or remote test platform 1150. The GUI 270 illustrated in FIG. 31 illustrates a lab view display to recreate the layout of a test lab or facility 272 including a plurality of test devices or stations 130. Such a GUI being representative of the physical locations or general layout of the test devices in the test lab or facility 272 is particularly useful since the user of such a display can more readily and/or accurately identify a desired test device to which requests will be made because the position and/or relationship of icons for the test devices 130 on the GUI corresponds to that of the test facility 270. As shown the GUI 270 includes menu portion 272 and a display portion 276. The menu portion 274 includes a menu of test devices or equipment selections 276 in addition to non-test device icons such as lab and furniture selections 278. The ability to include non-test device icons/elements in the GUI further aids the user in readily and accurately identifying the correct test device icon for the desired test device to which requests are made. As shown, the lab and furniture selections 278 include desk icons, chair however, application is not limited to particular furniture articles but can include structural elements of the lab facility such as walls (exterior and/or interior), partitions and the like as well as elements therein such as windows, doors or other openings.

To interface with the GUI 270 shown, an input or pointing device is used to select and position the test device and, if desired, non-test device icons (e.g. furniture) selections 277, 278 on the display portion 276 to recreate the actual arrangement or layout of the lab 272. Thus, user can arrange the display portion 276 to match the arrangement of the test stations in the lab so that the user has a quick reference to various testing devices 130 based upon location in the physical laboratory or facility. In the illustrated embodiment, the test device selections 277 include test stations or device icons corresponding to actual representations in the lab. The icons or selections for the test station are generated based device information for the test stations transmitted from the remote test platform 1150 to the GUI 270 utilizing URL or other identifications for the one or more test devices or facilities.

As appreciated by those skilled in the art the user or lab identification can be transmitted through a URL address or the user or lab identification can be inputted in response to an input prompt as well as through bar codes as previously described. FIG. 29 illustrates a lab view summary 280 of each of testing devices for one or more testing stations. As shown, the lab view summary 280 provides the computing device for each testing device, communication channels or station, run time and other information. A user can toggle between the lab overview 270 and lab summary 280 via input selections 285, 286. FIG. 30 illustrates a GUI for a single station view 290 for a particular test device. As shown, the single station view provides more detail data including command and feedback data. The single station view 290 is generated using a drill down function upon selection of a single test device icon or selection. Data for the single test device is retrieved from the remote test platform 1150 in response to activation of the drill down function using for example using communication protocols previously described.

FIG. 31 illustrates an alert notification implemented through an alert function of the mobile test platform tools 1152. In the illustrated embodiment, the alert function is a test complete function alert. As shown, implementation of the alert/notification function generates the outbound message 1200 to the remote test platform 1150. In response to the message 1200, the remote test platform 1150 generates the reply message 1202 to request the alert/notification. Alternatively, the test platform may send a notification to the remote test platform whenever a significant event occurs. The remote test platform will determine if any mobile device or user wants to be alerted of this event. If so then the remote test platform 1150 alerts the mobile or remote computing device through appropriate methods. As previously described, in response to the reply message 1202 the notification data is transmitted through the remote test platform to the mobile device. As shown the alert/notification display 295 includes a notification that the test run for Station I is complete and includes a link 296 to view a data log for the test data store in the remote test platform 1150.

In illustrated embodiments, the test platform can send a message 1200 to the remote test platform 1150 requesting which things it should watch and tell the remote test platform about when they happen. The test platform can then monitor these things (e.g. such as a limit on a signal) and will send a message to the remote test platform 1150 when that specific trigger occurs. The remote test platform 1150 can then act accordingly and alert remote devices or users that the trigger has occurred. This method is helpful when alerts are requested faster than the test platform can send them to the remote test platform 1150, or to reduce bandwidth so the test platform 1150 can make the decision of when the alert occurs instead of delaying the decision until the remote test platform gets the information.

Figure 32:
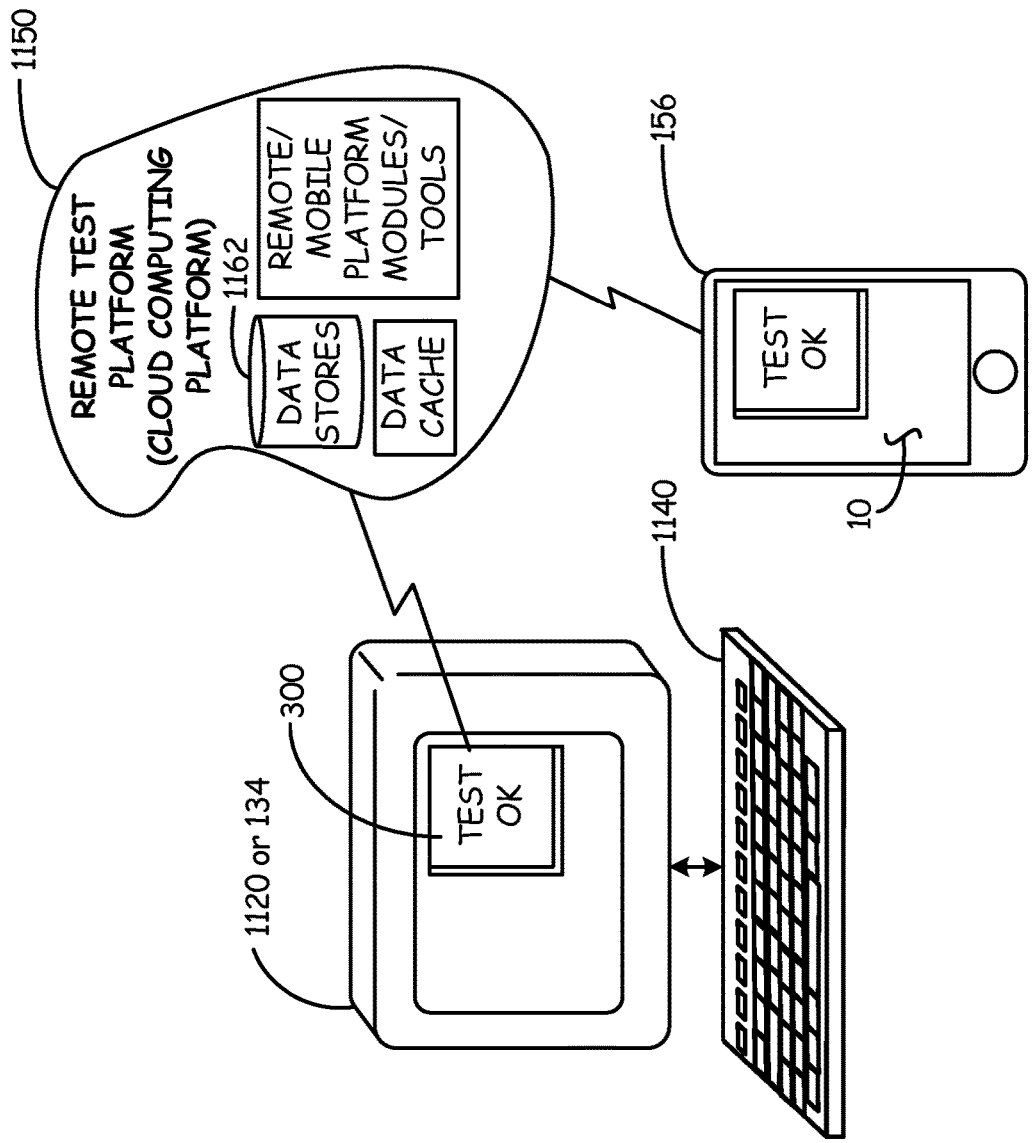
FIG. 32 illustrates an embodiment of a messaging function of the mobile test platform

FIG. 32 illustrates an exemplary messaging function implemented through mobile test platform modules and tools 1152 as previously described. As shown, a user at the test station can enter a message post 300 though a sticky note via input devices of the computing device 1120 or controller 134. In response to the input message post 300, the communication platform 1154 transmits the message to the mobile or remote computing device utilizing communication protocols previously described.

Figure 33:
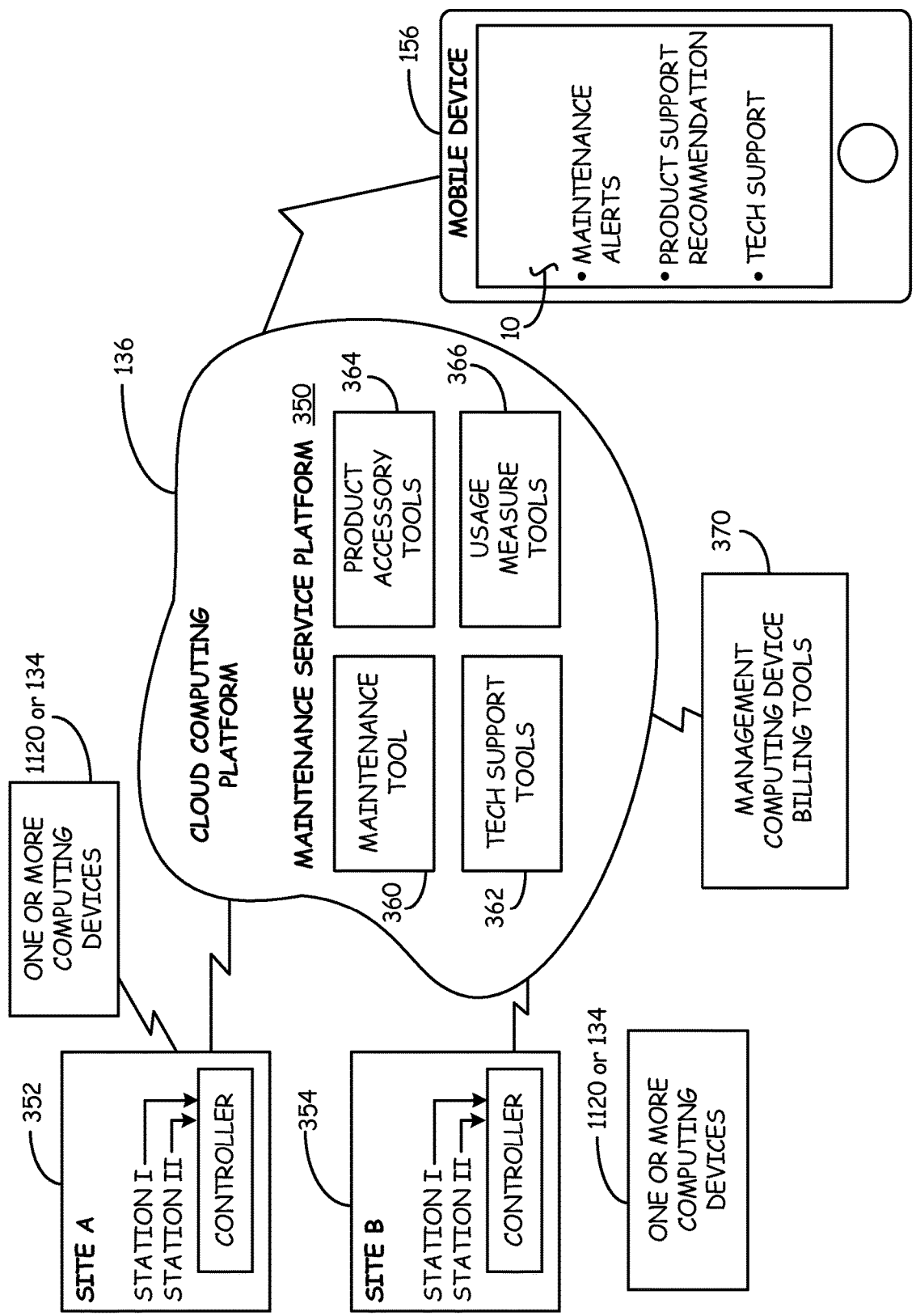
FIG. 33 illustrates an embodiment of a cloud computing platform including maintenance, tech support, product/accessory and usage measurement tools.

FIG. 33 illustrates a cloud based maintenance or service platform 350. In the illustrated embodiment, the platform is used to monitor and/or service multiple stations at sites A and B 352, 354. As shown and mentioned above, the platform 350 includes the maintenance tool 360, tech support tool 362, product/accessory support tool 364 and usage measurement tools 366. The tools are configured to interface with powered devices, such a hydraulic actuators or other power devices at sites A and B via communication protocols as previously described. The maintenance tool 360 uses maintenance data from controller units or devices of site A or Site B to issue maintenance alerts and schedule maintenance procedures. Maintenance data can be calculated based upon damage unit calculations using hours of use to calculate the maintenance status as, cycle counts, the amount of force applied over a time period with higher forces accounting for example previously described more damage units than smaller forces.

The tech support tool 362 utilizes technical information for station devices to provide technical support to users through remote computing device 1204 or mobile devices. The type and model of the devices are identified based upon associated device and station codes. The product support tools 364 provide product or accessory suggestion for users of station or test devices through the GUI at the test device 130 and/or the mobile and remote devices 156. For example, tech support tool 362 generate a message and sent to the remote test platform 1150, which is then subsequently rendered by the station device, test device and/or mobile device 156 having a known association with the testing device 130. The corresponding GUI can generate a button, link, icon or other form of user selectable feature to obtain further information related to the message. For example, activation of the user selectable feature can directly or indirectly (through the remote test platform 1150) transmitted to the tech support tool 362. The tech support tool 252 can then transmit further information concerning the possible accessory (such as connecting the user to an online catalog or personnel equipped to take the order and/or answer questions), product update information, information concerning maintenance just to name a few type of further information. Usage tools 366 can automatically interface with the necessary controllers to retrieve usage parameters related to the current state of the test device or test station, such as but not limited to use time or cycles for the device if such current state information is needed by the tech support tool 362. Information from the tools 360, 362, 364, 366 can be broadcasted to remote computing device (not shown) or mobile device as previously described. As shown, information from the tools is also transmitted or broadcasted to a management device 370 for central control. Management device 370 can be a desk top computer or server. Maintenance information provided to the management device is used to monitor and schedule maintenance for station devices. Usage information provided to the management device 370 can be used to monitor service agreement and determine billing amounts for a service contract based upon usage.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A system configured to monitor a testing operation, the system comprising:
   a testing device comprising:
     an image capture device; and
     a computing device operatively connected to the image capture device to receive information on the testing operation from the image capture device, the computing device having a controller configured to receive information pertaining to the testing operation and to render on a display an information message indicative of parameters of the testing device at a selectable amount of progress through the testing operation;
   a mobile communication platform remotely located from the testing device and configured to receive an input message from the remotely located testing device, the input message indicating, before any sending of test data or information, that the test data or information is available from the remotely located testing device, and to generate a reply message to request the test data or information from the remotely located testing device; and
   a messaging platform configured to interface with one or more remote or mobile computing devices to transmit the test data or information for the remotely located testing device to the one or more remote computing devices.

2. A system configured to monitor a testing operation on a testing device, comprising:
   an image capture device configured to capture an image of the testing device or of a specimen separate from and being tested on the testing device;
   a display;
   a computing device operatively connected to the image capture device to receive information on the testing operation from the image capture device, the computing device having a controller configured to receive information pertaining to the testing operation; to render on the display an information message having a first portion indicative of the testing device, a second portion indicative of information related to the testing device or a test being conducted on the testing device, and a third portion indicative of time that has elapsed since the second portion has occurred; and to update the third portion indicative of the time has elapsed;
   a mobile communication platform remotely located from the testing device and configured to receive an input message from the remotely located testing device, the input message indicating, before any sending of test data or information, that the test data or information is available from the remotely located testing device, and to generate a reply message to request the test data or information from the remotely located testing device; and
   a messaging platform configured to interface with one or more remote or mobile computing devices to transmit the test data or information for the remotely located testing device to the one or more remote computing devices.

3. The system of claim 2, wherein the image capture device is configured to capture images of the testing operation, and to convey to the computing device images associated with the testing operation.

4. The system of claim 3, wherein the image capture device is configured to convey images associated with a failure of the testing operation to the computing device upon the failure.

5. The system of claim 2, wherein the image capture device is configured to capture a video of the testing operation, and to convey to the computing device video associated with the testing operation.

6. The system of claim 5, wherein the image capture device is configured to convey video associated with a failure of the testing operation to the computing device upon the failure.

7. The system of claim 2, wherein the computing device is further configured to render on the display an alert for a condition of the testing device.

8. A testing system; comprising:
   a test platform having a test platform controller operatively coupled to the test platform;
   an image capture device operatively coupled to the test platform controller, to capture information pertaining to a test, the test platform, or a test specimen separate from and capable of being tested on the test platform;

wherein the test platform controller is configured to generate an information message having a first portion indicative of a testing device of one or more testing devices, a second portion indicative of information related to a test being conducted on the testing devices, and a third portion indicative of time that has elapsed since the second portion has occurred wherein the information message includes at least one image received from the image capture device and related to the test being conducted;

a mobile communication platform remotely located from the testing platform and configured to receive an input message from the remotely located test platform, the input message indicating, before any sending of test data or information, that the test data or information is available from the remotely located test platform, and to generate a reply message to request the test data or information from the remotely located test platform; and a messaging platform configured to interface with one or more remote or mobile computing devices to transmit the test data or information for the remotely located test platform to the one or more remote computing devices.

9. The testing system of claim 8, wherein the information pertaining to the test includes an indication of a test failure.

10. The testing system of claim 9, wherein the information pertaining to the test includes an image or video of the failure.

11. The testing system of claim 8, wherein the information pertaining to the test includes an image or video of a testing operation.

* * * * *